(12) United States Patent
Honey et al.

(10) Patent No.: US 6,965,397 B1
(45) Date of Patent: Nov. 15, 2005

(54) MEASURING CAMERA ATTITUDE

(75) Inventors: Stanley K. Honey, Palo Alto, CA (US); Richard H. Cavallaro, Mountain View, CA (US); Marvin S. White, San Carlos, CA (US); Terence J. O'Brien, San Jose, CA (US); Matthew T. Lazar, Redwood City, CA (US); Stuart K. Neubarth, Mountain View, CA (US); Alan C. Phillips, Los Altos, CA (US); Kenneth A. Milnes, Fremont, CA (US)

(73) Assignee: Sportvision, Inc., New York, NY (US)

( * ) Notice: Subject to any disclaimer, the term of this patent is extended or adjusted under 35 U.S.C. 154(b) by 0 days.

(21) Appl. No.: 09/472,635

(22) Filed: Dec. 27, 1999

Related U.S. Application Data

(60) Provisional application No. 60/166,725, filed on Nov. 22, 1999.

(51) Int. Cl.[7] .................. H04N 5/228; G03B 17/00
(52) U.S. Cl. .................. 348/208.2; 348/208.3; 348/208.99; 396/13; 396/52; 396/53; 396/421; 352/53; 74/5.22; 33/318; 33/320; 33/321; 33/328
(58) Field of Search .................. 348/208, 211, 169, 348/208.2, 208.3; 396/13, 421, 52, 53; 352/53; 74/5.22; 33/318, 320, 321, 323, 328

(56) References Cited

U.S. PATENT DOCUMENTS

| | | | | |
|---|---|---|---|---|
| 3,769,710 A | * | 11/1973 | Reister | 33/320 |
| 4,084,184 A | * | 4/1978 | Crain | 348/116 |
| 4,811,491 A | | 3/1989 | Phillips et al. | 33/366 |
| 5,264,933 A | * | 11/1993 | Rosser et al. | 348/578 |
| 5,311,195 A | | 5/1994 | Mathis et al. | 342/357 |
| 5,462,275 A | * | 10/1995 | Lowe et al. | 463/4 |
| 5,479,597 A | | 12/1995 | Fellous | 395/154 |
| 5,523,811 A | | 6/1996 | Wada et al. | 354/76 |
| 5,534,967 A | * | 7/1996 | Matsuzawa | 396/55 |
| 5,543,856 A | | 8/1996 | Rosser et al. | |
| 5,627,915 A | | 5/1997 | Rosser et al. | |
| 5,649,237 A | * | 7/1997 | Okazaki | 396/55 |
| 5,808,695 A | | 9/1998 | Rosser et al. | |
| 5,815,411 A | | 9/1998 | Ellenby et al. | 364/559 |
| 5,892,554 A | | 4/1999 | DiCicco et al. | |
| 5,894,323 A | | 4/1999 | Kain et al. | 348/116 |

(Continued)

FOREIGN PATENT DOCUMENTS

GB 2312582 10/1997

(Continued)

Primary Examiner—James J. Groody
Assistant Examiner—Brian C. Genco
(74) Attorney, Agent, or Firm—Vierra Magen Marcus Harmon & DeNiro LLP

(57) ABSTRACT

A system is disclosed for using camera attitude sensors with a camera. A camera assembly includes a tripod base, a tripod head interface mounted on the tripod base, a tripod head mounted on the tripod head interface and a camera mounted on the tripod head. The tripod head enables the camera to pan and tilt. The system also includes a first optical encoder for detecting the amount that the camera has been panned and a second optical encoder for detecting the amount that the camera has been tilted. Two inclinometers are mounted on the tripod head interface to measure attitude of the tripod head. Two gyroscopes ("gyros") are mounted on the camera assembly. Data from the encoders, gyros and inclinometers are packaged and sent to graphics production equipment to be used for enhancing video captured by the camera.

33 Claims, 10 Drawing Sheets

U.S. PATENT DOCUMENTS

| | | |
|---|---|---|
| 5,903,317 A | 5/1999 | Sharir et al. |
| 5,923,365 A | 7/1999 | Tamir et al. |
| 5,953,076 A | 9/1999 | Astle et al. |
| 6,100,925 A * | 8/2000 | Rosser et al. ............... 348/169 |
| 6,122,013 A | 9/2000 | Tamir et al. |
| 6,184,937 B1 | 2/2001 | Williams et al. |
| 6,191,825 B1 | 2/2001 | Sprogis et al. |
| 6,201,579 B1 | 3/2001 | Tamir et al. |
| 6,208,386 B1 | 3/2001 | Wilf et al. |
| 6,271,890 B1 | 8/2001 | Tamir et al. |
| 6,292,227 B1 | 9/2001 | Wilf et al. |
| 6,297,853 B1 | 10/2001 | Sharir et al. |
| 6,304,298 B1 | 10/2001 | Steinberg et al. |
| 6,380,933 B1 | 4/2002 | Sharir et al. |
| 6,384,871 B1 | 5/2002 | Wilf et al. |
| 6,438,508 B2 | 8/2002 | Tamir et al. |
| 6,446,261 B1 | 9/2002 | Rosser |
| 6,486,910 B1 * | 11/2002 | Kaneda et al. ......... 348/208.99 |
| 6,529,613 B1 | 3/2003 | Astle |
| 6,559,884 B1 | 5/2003 | Tamir et al. |
| 6,626,412 B1 * | 9/2003 | Lindsay ...................... 248/550 |
| 6,734,901 B1 * | 5/2004 | Kudo et al. ............. 348/208.4 |
| 6,781,622 B1 * | 8/2004 | Sato et al. ............... 348/208.4 |
| 2001/0001242 A1 | 5/2001 | Tamir et al. |
| 2001/0048483 A1 | 12/2001 | Steinberg et al. |

FOREIGN PATENT DOCUMENTS

| | | | | |
|---|---|---|---|---|
| GB | 2323733 | | 9/1998 | |
| IL | 105764 | | 5/1993 | |
| JP | 09133964 | * | 9/1995 | .......... G03B 17/56 |
| WO | WO 93/02524 | | 2/1993 | |
| WO | WO 96/05689 | | 2/1996 | |
| WO | WO 97/03517 | | 1/1997 | |
| WO | WO 98/24243 | | 6/1998 | |
| WO | WO 98/28906 | | 7/1998 | |
| WO | WO 99/38320 | | 7/1999 | |
| WO | WO 99/53339 | | 10/1999 | |
| WO | WO 00/14959 | | 3/2000 | |
| WO | WO 00/28731 | | 5/2000 | |
| WO | WO 00/64144 | | 10/2000 | |
| WO | WO 00/64176 | | 10/2000 | |
| WO | WO 01/13645 | | 2/2001 | |

* cited by examiner

MEASURING CAMERA ATTITUDE

CLAIM OF PRIORITY

This Application claims the benefit of U.S. Provisional Application No. 60/166,725, Measuring Camera Attitude, filed on Nov. 22, 1999. That Provisional Application is incorporated herein by reference.

BACKGROUND OF THE INVENTION

1. Field of the Invention

The present invention is directed to a system for using camera attitude sensors.

2. Description of the Related Art

The remarkable, often astonishing, physical skills and feats of great athletes draw millions of people every day to follow sports. In particular, the number of people watching sports on television and the amount of advertising revenue received for televised sports has increased significantly. To satisfy the increased demand for televised sports, broadcasters have deployed a varied repertoire of technologies to highlight these exciting events for viewers. For example, broadcasters have started adding graphical enhancements to the video of the sporting events. Examples of graphic enhancements have included highlighting moving objects, highlighting portions of a playing field (e.g. first down line), adding virtual advertisements and the addition of other graphics to the video of the event.

The systems being employed for providing graphical enhancements to video have generally fallen into two categories. The first category of systems uses pattern recognition to recognize certain features in the video in order to accurately place the graphic into the video. A second category of systems uses sensors to measure the attitude of the camera capturing the video and then uses the measured camera attitude information to accurately insert the graphic into the video. It has been found that prior systems that only use pattern recognition have not been robust enough to account for rapid movement of the camera during the event and may be too slow for live events. Some systems that use pattern recognition have attempted to compensate for these deficiencies by using camera attitude sensors in combination with pattern recognition.

Systems that rely on camera attitude information require precise measurements of the orientation of a camera at any given time. Certain situations beyond the broadcaster's control can interfere with and be a source of error when measuring camera attitude information. For example, cameras at a sporting event typically are located at predesignated camera locations. Sometimes the camera location has a floor that can sag or wobble. As a heavy camera is panned and tilted, the weight distribution of the camera and/or operator may cause the floor to sag or wobble. A camera operator moving at the camera location may also cause the floor to sag or wobble. Additionally, during an event, the tripod holding the camera can be kicked or moved. The floor of the camera location can also vibrate at either a high frequency or low frequency because of other activity in the stadium, for example, fans jumping, fans stomping their feet, etc. Additionally, mechanical compliance of the various parts of the tripod and mount can also hinder an accurate camera attitude reading.

Thus, there is a need for an improved camera attitude measurement system to better measure camera attitude in light of the sources of error described above.

SUMMARY OF THE INVENTION

The present invention is directed to an improved system for using attitude sensors with a camera. The camera can be part of a camera assembly which includes a movable portion and a fixed portion. One example of a camera assembly includes a tripod base, a tripod head interface mounted on the tripod base, a tripod head mounted on the tripod head interface and a camera mounted on the tripod head. In one embodiment, the system includes a first sensor coupled to the camera assembly and a first inclinometer coupled to the camera assembly. Instead of, or in addition to, the first inclinometer, the system could have a first gyroscope ("gyro") coupled to the camera assembly. The first sensor measures the position of the moveable portion of the camera assembly relative to the fixed portion of the camera assembly. In one embodiment, the first sensor is an optical encoder. In one alternative, the system includes two optical encoders, two inclinometers and three gyros. Data from the camera attitude sensors are combined to describe the orientation of the camera. One means for describing the orientation of the camera includes setting up one or more transformation matrices. Alternatively, the data from the various camera attitude sensors can be combined to result in a set of angles describing the orientation of the camera. This information can be displayed on a monitor, printed, stored on a computer readable storage medium or passed to a software process.

The output of the camera attitude sensors are typically communicated to a camera sensor electronics package which receives the camera attitude data and packages the data for communication to graphics production equipment. In one embodiment, the data from the sensors is encoded on an audio signal and sent to the graphics production equipment (usually located remotely from the camera) via an audio line (or microphone line) from the camera. In one use of the present invention, the graphics production equipment receives the sensor data, demodulates the audio and uses the camera attitude data to add a graphic to a video image from the camera. In one alternative, the graphic corresponds to a three dimensional location within a field of view of the camera. The three dimensional location corresponds to a first position in the video image, and the graphic is added to the video image at the first position. In one embodiment, the three dimensional location is converted to the first position in the video image using one or more transformation matrices.

One method for practicing the present invention includes sensing data from a first sensor, sensing data from a second sensor and combining the data from the two sensors. In one embodiment, the second sensor can be a gyro or an inclinometer. The first sensor measures relative position of the movable portion of the camera assembly with respect to the fixed portion of the camera assembly.

Portions of the above-described process are performed using the sensors described above in combination with various hardware and software. The software for implementing the present invention can be stored on processor readable storage media. Examples of suitable processor storage media include RAM, ROM, hard disk, floppy disk, CD-ROM, flash memory, etc. In another alternative, the method can be performed on specialized hardware designed to specifically perform the functionality described herein.

The hardware and software described to perform the present invention can be used for purposes of adding one or more graphics to live or delayed video of a sporting event.

Alternatively, the hardware and/or software of the present invention can be used to determine attitude information for other purposes, for example, enhancing video of non-sporting events and for determining attitude for purposes other than enhancement of video.

These and other objects and advantages of the present invention will appear more clearly from the following description in which the preferred embodiment of the invention has been set forth in conjunction with the drawings.

DETAILED DESCRIPTION

Figure 1A:
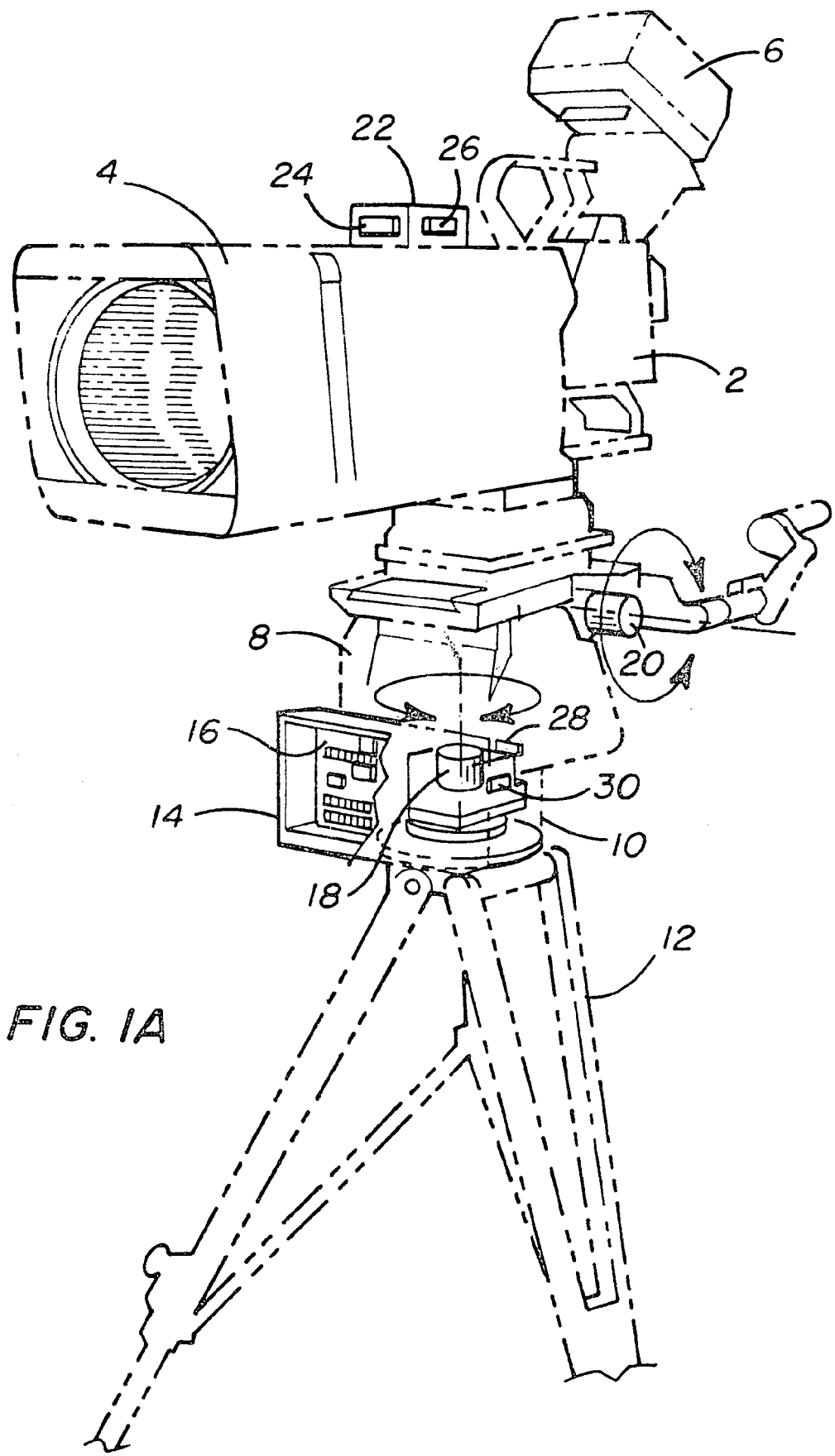
FIG. 1A shows a camera mounted on a tripod.

FIG. 1A shows a camera mounted on a tripod, using the sensors of the present invention. Specifically, FIG. 1A shows camera 2 with lens 4 and viewing monitor 6. Camera 2 is mounted on tripod head 8. Tripod head 8 (also called a pan-tilt head) is mounted on tripod head interface 10, which is mounted on tripod 12. Tripod head 8 allows camera 2, lens 4 and monitor 6 (collectively referred to as "camera") to pan and tilt. One example of a suitable tripod head is the Vector 70 from Vinten, Inc. Although it is called a "tripod head," tripod head 8 need not be used with a tripod. The term tripod head is used to describe an apparatus that allows a camera to change its orientation (e.g. pan and tilt). Tripod head interface 10 is mounted between tripod head 8 and tripod 12, and includes some of the sensors and electronics of the present invention. For example, shown in FIG. 1A inside tripod head interface 10 are pan encoder 18, inclinometer 28 and inclinometer 30. Mounted to the outside of tripod head interface 10 is box 14, which houses camera sensor electronics 16.

Tilt encoder 20 has a shaft. That shaft is coupled to top platform 86 of tripod head 8 (see FIG. 1B). Top platform 86 is mounted to camera 2. As camera 2 and top platform 86 tilts, the shaft of encoder 20 will rotate. In one embodiment, encoders 18 and 20 shown in FIG. 1 are optical shaft encoders. One example of an appropriate encoder is the CP-850 series encoder (including CP-850-HCE-131072) manufactured by Computer Optical Products, Inc., 9305 Eton Avenue, Chatsworth, Calif. 91311. The CP-850 series encoder is an optical shaft encoder. Other suitable encoders can also be used. The encoders measure rotational position relative to the tripod and/or tripod head interface. For example, tilt encoder 20 measures movement of top platform 86 about a tilt axis in relation to tripod head interface 10. Pan encoder 18 measures the rotational position of platform 86 (as well as the camera and lens) about a pan axis in relation to tripod head interface 10. As will be discussed below, inclinometers 28 and 30 can be used to measure changes in the pan axis and the tilt axis.

One example of a suitable inclinometer uses liquid between a pair of plates, and measures change of capacitance. Another example is an electrolyte varying the conductance between two conductors. In one embodiment, a suitable inclinometer indicates an absolute angle (relative to gravity or other acceleration). In one example, the inclinometer can indicate angles up to plus or minus one degree, plus or minus 1.5, degrees, or plus or minus six degrees. Other suitable ranges can also be used. An example of a suitable inclinometer is the Ceramic Tilt Sensor SH50054 from Spectron, 595 Old Willets Path, Hauppaug, N.Y. 11788, (516) 582-5600. Other suitable inclinometers can also be used with the present invention.

Looking back at FIG. 1A, mounted on top of lens 4 is block 22. Mounted on one surface of block 22 is gyro 24. Mounted on a second surface of block 22 is a second gyro 26. The surface that gyro 24 is mounted on is orthogonal to the surface that gyro 26 is mounted on. In one embodiment, an additional gyro is mounted on a surface orthogonal to gyro 24 and gyro 26. In another embodiment, the gyros (two or three gyros) can be mounted on tripod 12 or on tripod head interface 10. For example, the gyros can be mounted to plate 80 or another portion of tripod interface 10. When mounted on tripod interface 10, it is advantageous to mount two of the gyros in a fixed parallel relation to the inclinometers, that is, one gyro is aligned to read data for the same axis as one inclinometer. In another embodiment, references 28 and 30 can represent both an inclinometer and a gyro. Mounting the gyros on tripod interface 10 simplifies the math used for the present invention. While the encoders measure angles relative to a fixed base, the gyros measure absolute angular rate with respect to an internal frame.

In one embodiment, the gyros of FIG. 1 are fiber optic gyros. An example of a suitable fiber optic gyro is the E-Core 2000 Series Fiber Optic Gyro manufactured and sold by KVH Industries, Inc., 50 Enterprise Center, Middleton Road, R.I. 02842. Other gyros that can also be used include a ring laser, mechanical gyro, tuning fork, spinning disk gyro, semi conductor gyro, etc. Other sensors can also be used that measure change in angle or angular rate. The output of the E-Core 2000. Fiber Optic Gyro is an analog signal proportional to its angular rate. Integrating the output of the gyro over a period of time will produce an angle delta for that period of time. That is, the result of integration will indicate that the gyro was just rotated by a certain angle. The gyros used in FIG. 1A are single axis. However, multi-directional gyros or multiple gyros can also be used. In one embodiment, the system can use three or more gyros instead of two, in order to measure pitch, roll and yaw. The gyros can be used to measure high frequency vibrations and mechanical compliance between portions of the camera assembly. In one alternative, rather than using an angular rate gyro, the system can use an absolute angle gyro.

Figure 1B:
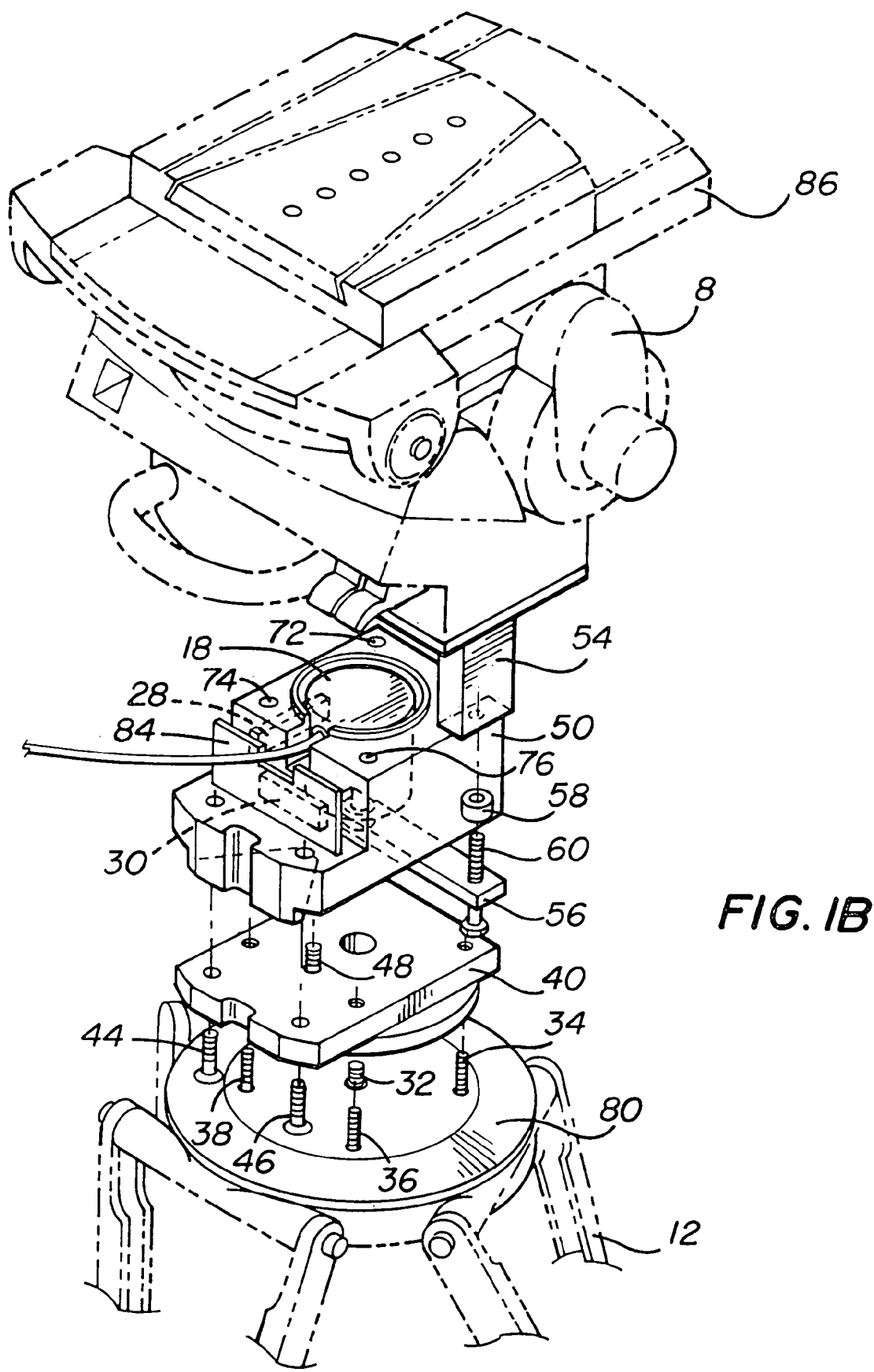
FIG. 1B shows an exploded view of the tripod head interface.
Figure 1C:
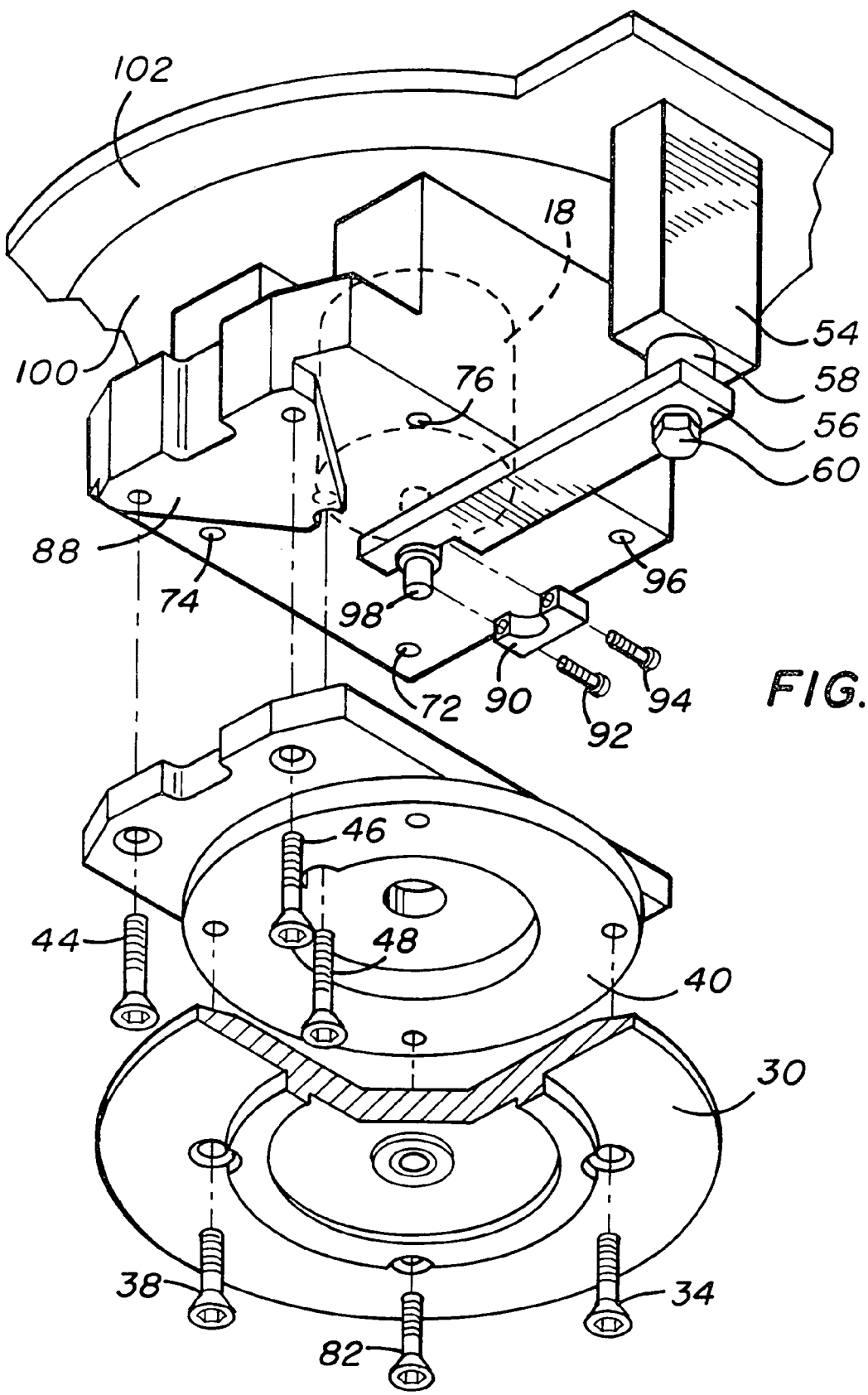
FIG. 1C is an exploded view of a portion of the tripod head interface.

FIG. 1B shows an exploded view of tripod head interface 10. In one embodiment, the components of tripod head interface 10 are surrounded by a housing, which is not depicted in FIG. 1B. The components of tripod head interface 10 are shown below tripod head 8 and above tripod 12. Plate 80 is coupled to tripod 12 using screw 32. Plate 80 is also mounted to mount 40 using screws 34, 36, 38 and screw 82 (screw 82 is shown in FIG. 1C). Mount 40 is attached to block 50 using screws 44, 46 and 48. Mounted inside block 50 is pan encoder 18. Block 50 includes a triangular portion which protrudes out from the bottom of block 50 (see FIG. 1C) causing a separation between block 50 and mount 40. Residing in the space between block 50 and mount 40 is arm 56 which is connected to member 54 using screw 60. Located between member 54 and arm 56 is a self aligning spacer 58.

Figure 1D:
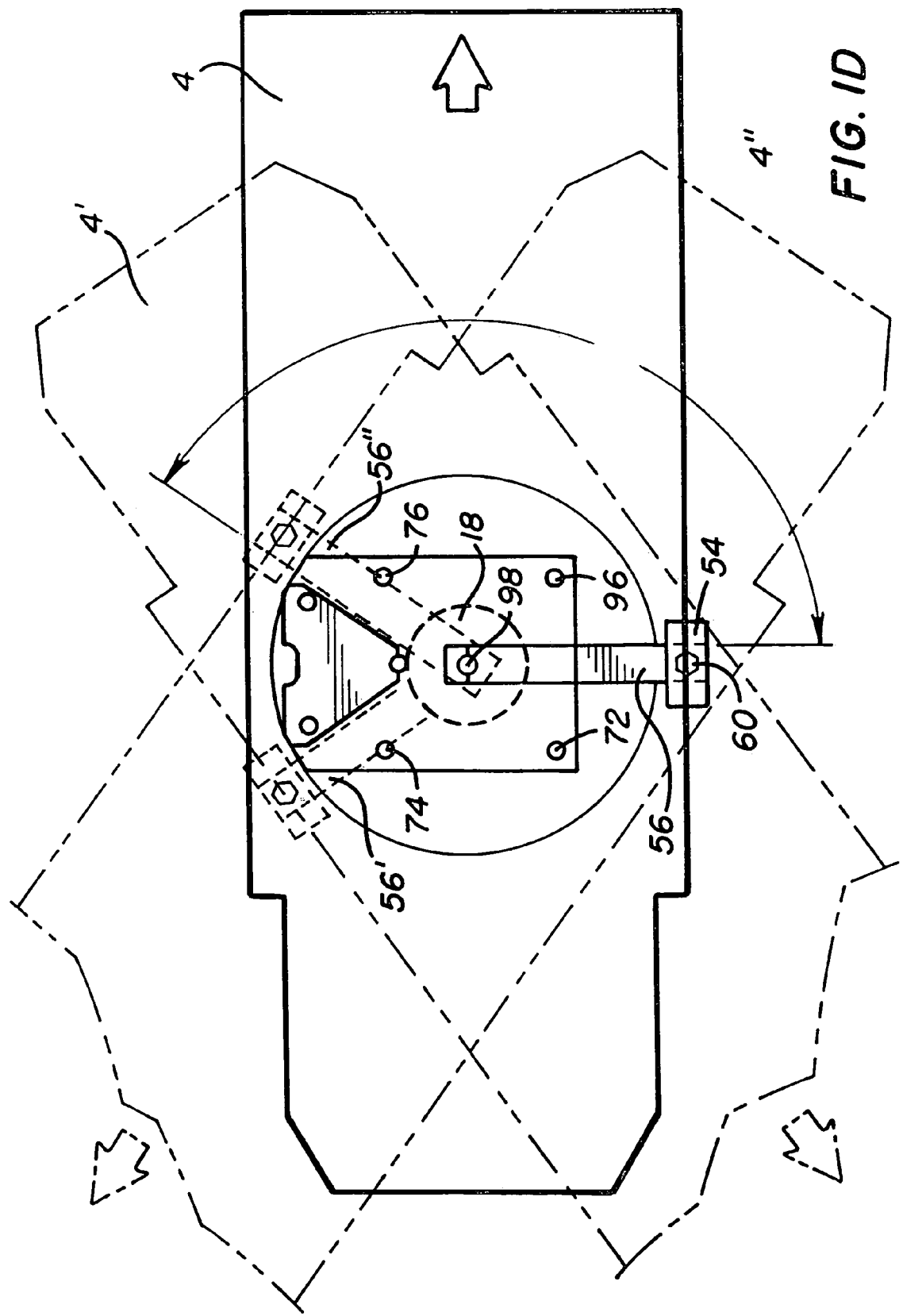
FIG. 1D is a bottom view of a portion of the tripod head interface, showing the camera lens panned at three different angles.

As will be shown in FIGS. 1C and 1D, arm 56 is coupled to the shaft of pan encoder 18. Member 54 is coupled to tripod head 8. As tripod head 8 rotates (pans), arm 56 also rotates, which causes the shaft of pan encoder 18 to rotate, thereby, allowing pan encoder 18 to measure the rotation or pan of the camera.

Mounted on one surface of block 50 is inclinometer 30. Mounted on a second surface of block 50 is a second inclinometer 28. The surface that inclinometer 28 is mounted on is orthogonal to the surface that inclinometer 30 is mounted on. Mounted in front of inclinometer 30 is a PC board 84. Inclinometer 28 and inclinometer 30 are both connected to PC board 84. In one embodiment, PC board 84 includes electronics that are in communication with camera sensor electronics 16. Block 50 includes four holes 72, 74, 76 and 96 (hole 96 is shown in FIG. 1C) that house screws for mounting block 50 to plate 100 (see FIG. 1C).

As described above, one embodiment that simplifies the math includes mounting the gyros on plate 80. In one embodiment, plate 80 depicted in FIG. 1B would be re-designed so that it was a unitary structure with two portions. The first portion would be circular with mounting holes as depicted in FIG. 1B. The second portion would include a beam protruding from the circular portion. In one alternative, the beam would extend six inches. Three gyros are mounted on the beam such that the three gyros are mounted orthogonal to each other.

FIG. 1C shows additional details of tripod head interface 10. Specifically, FIG. 1C shows arm 56 engaging shaft 98 of encoder 18. At the end of arm 56 is end portion 90 coupled to arm 56 via screws 92 and 94. Member 54 is mounted on plate 102 via two screws that are not shown in the drawings. Plate 102 is mounted to tripod head 8 so that when tripod head 8 rotates (pans) then member 54 and arm 56 are also rotated about the pan axis, causing shaft 98 to rotate and allowing encoder 18 to measure that rotation. The screws residing in holes 72, 74, 76 and 96 mount block 50 to plate 100. Plate 100 is coupled to plate 102 using bearings so that plate 102 will rotate with respect to plate 100. In the embodiment depicted in FIGS. 1A–1D, plate 80, mount 40, block 50 and plate 100 are stationary with respect to tripod 12. As tripod head 8 is rotated about the pan axis, the camera and plate 102 also rotate.

FIG. 1C also shows more detail of the coupling of mount 40 to block 50. Specifically, triangular portion 88 and block 50 are shown in more detail. Because triangular portion 88 is raised from the remaining portion of the bottom surface of block 50, there is sufficient space between block 50 and mount 40 to allow for the presence of arm 56. Additionally, block 50 is contained within a housing.

FIG. 1D shows lens 4 in three different positions (4, 4' and 4"). As can be seen, as lens 4 is moved to position 4', arm 56 is rotated to position 56'. As lens 4 is rotated to position 4", arm 56 is rotated to position 56". As arm 56 is rotated to position 56' and 56", shaft 98 is similarly rotated.

Figure 2:
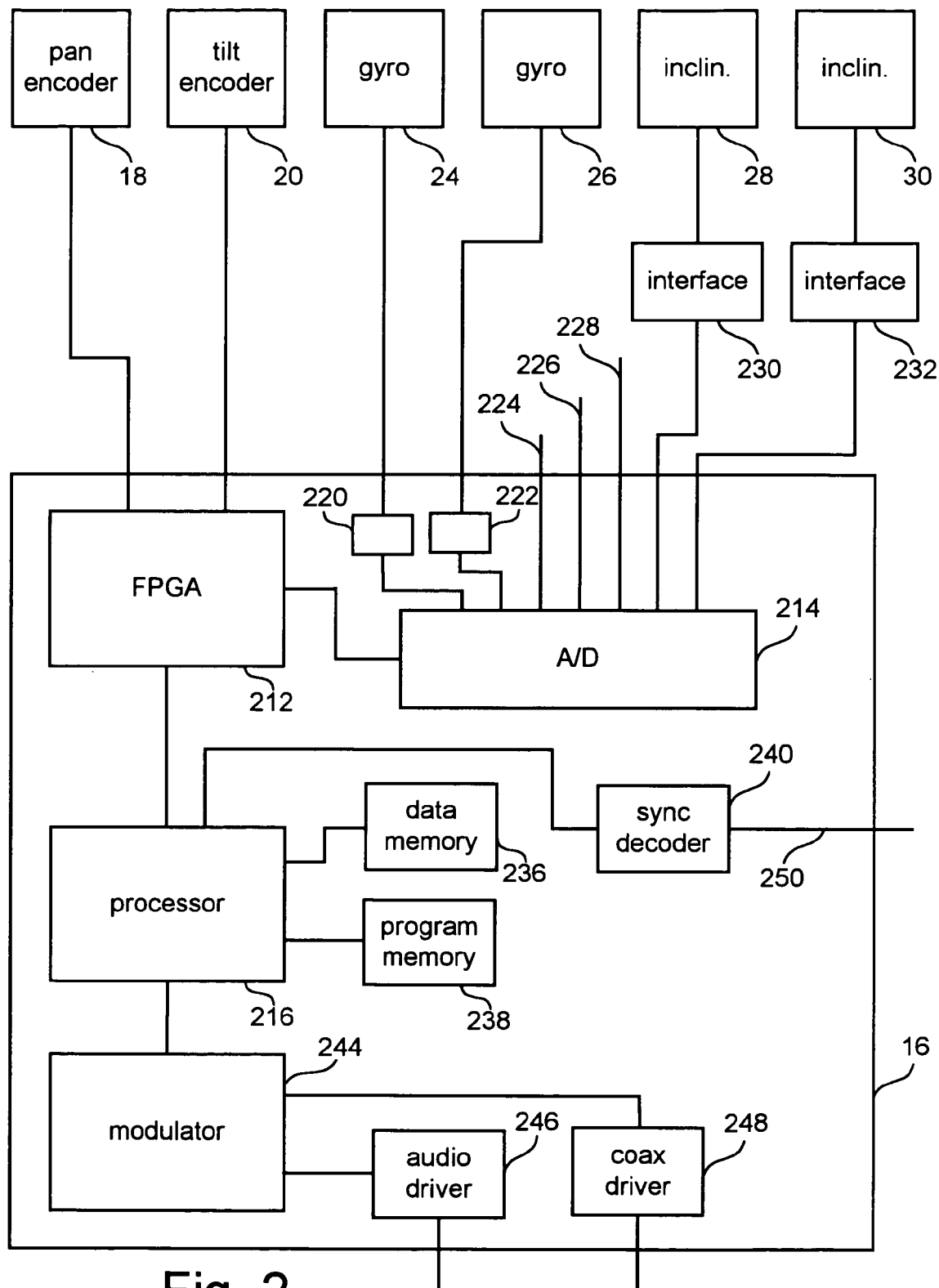
FIG. 2 is a block diagram of the electronics associated with the camera attitude sensors.

FIG. 2 shows a block diagram of the electronics for using the camera attitude sensors. FIG. 2 shows pan encoder 18, tilt encoder 20, gyro 24, gyro 26, inclinometer 28 and inclinometer 30. The output of pan encoder 18 and tilt encoder 20 are sent to FPGA 212. Pan encoder 18 and tilt encoder 20, in one embodiment, are optical encoders that output a signal, measured as a number of counts (or pulses), indicating the rotation of shaft. The output signal is a quadrature signal indicating rate and direction. FPGA 212 decodes the signal from the shaft encoders to output a count. FPGA 212 also controls analog to digital converter 214 and provides interface logic for processor 216. In regard to the analog to digital converter 214, FPGA 212 provides interface logic and a buffer, including a register to store a value for each sensor connected to analog to digital converter 214.

Gyro 24 is connected to interface board 220, which is connected to analog to digital converter 214. Interface board 220 comprises electronics for receiving a signal from gyro 24 and presenting the information to analog to digital converter 214. The electronics of board 220 includes a differential amplifier and other electronics which can reject common mode noise and amplify the signal from the gyro. The output of gyro 26 is connected to interface board 222. Interface board 222 operates in the same manner as interface board 220 and is also connected to analog to digital converter 214.

Signal 224 represents the electrical output of the zoom lens potentiometer of the camera and is connected to analog to digital converter 214. Signal 226 represents the electrical output of the 2X extender of the camera and is connected to analog to digital converter 214. Signal 228 represents the connection to the lens of the camera, provides the value of the focus of the camera and is connected to analog to digital converter 214.

The output of inclinometer 28 is connected to interface board 230. The output of inclinometer 30 is connected to interface board 232. The outputs of interface board 230 and interface board 232 are both connected to analog to digital converter 214. Analog to digital converter 214 converts the input analog signals to digital signals, and sends the output digital signals to FPGA 212. FPGA 212 includes a register for each of the sensors. In one embodiment, the electronics of interface boards 230 and 232 are included on PC board 84. In one alternative, PC board 84 can include electronics and LEDs to indicate when tripod head 8 is level.

Processor 216 is in communication with data memory 236 for storing data and program memory 238 for storing program code. In one alternative, memory 238 is a flash memory and memory 236 is a static RAM. In one embodiment, processor 216 is an 8032 processor from Intel. Processor 216 also receives an output signal from sync decoder 240. Sync decoder 240 receives a video signal 250 from camera 2. Sync decoder 240 generates a sync signal so that the data from the sensors can be synchronized to the video. In one embodiment, the video is transmitted at 30 frames per second. Other video rates can also be used. Processor 216 assembles data from each of the sensors into a packet and sends the data to modulator 244. Processor 216 assembles the data using the sync signal so that data is collected and sent in synchronization with the video from the camera. For example, data can be sent for every field, every video frame, every other video frame, every third video frame, etc. In one embodiment, the packet of data sent from processor 216 does not include time code or any type of synchronization signal.

Modulator 244 receives the packet of data from processor 216 and encodes data for transmission on an audio frequency signal. The output of modulator 244 is sent to audio driver 246 and coax driver 248. Most broadcast cameras have a microphone input channel. The output of audio driver 246 is sent to the microphone input channel for camera 2. The camera then combines the audio input channel with the video and sends a combined signal to the production equipment. If the audio signal is needed on a coax cable, then that signal is received from coax driver 248. In one embodiment, there can also be an RS232 or RS422 output directly from processor 216.

Figure 3:
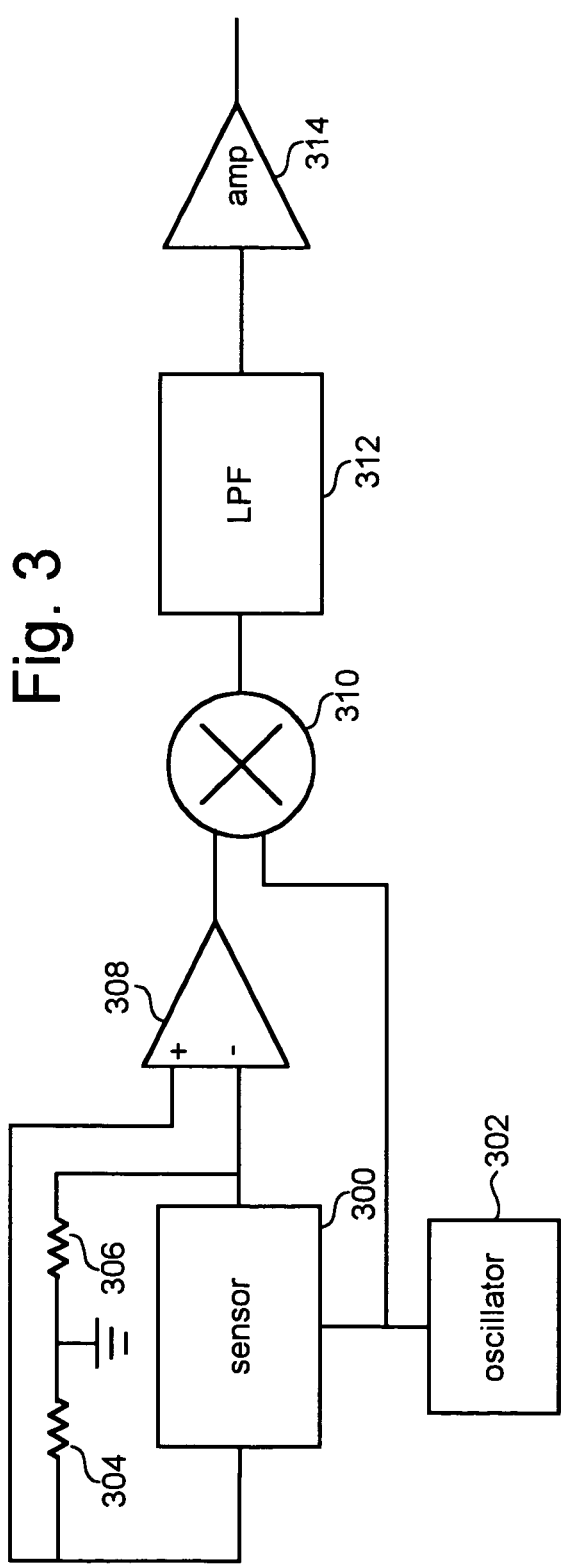
FIG. 3 is a block diagram of the interface electronics for an inclinometer of the present invention.

FIG. 3 is a block diagram of interface boards 230 and 232. Note, in one embodiment, interface board 230 and 232 can be combined as one board with two inputs and two outputs. FIG. 3 shows sensor 300, which can be inclinometer 28 or inclinometer 30. One input to sensor 300 is oscillator 302, which provides a 2.5 KHz square wave. Sensor 300 has two outputs. One output is connected to one end of resistor 304 and the positive terminal of differential amplifier 308. The other output is connected to one end of resistor 306 and the negative terminal of differential amplifier 308. The other ends of resistor 304 and 306 are connected together and to ground. The output of differential amplifier 308 is sent to multiplier 310. The output of oscillator 302 is also sent to multiplier 310. In one embodiment, multiplier 310 operates to convert the output of amplifier 308 to a DC signal. The output of multiplier 310 is sent to low pass filter 312 which removes noise, specifically the 2.5 KHz oscillator signal. In one embodiment, low pass filter 312 has a 40 Hz cut off frequency. The output of low pass filter 312 is sent to amplifier 314. The output of amplifier 314 is a linear voltage output indicating inclination angle. In one embodiment, the dynamic range of the circuit of FIG. 3 is plus or minus 1.5 degrees.

Figure 4:
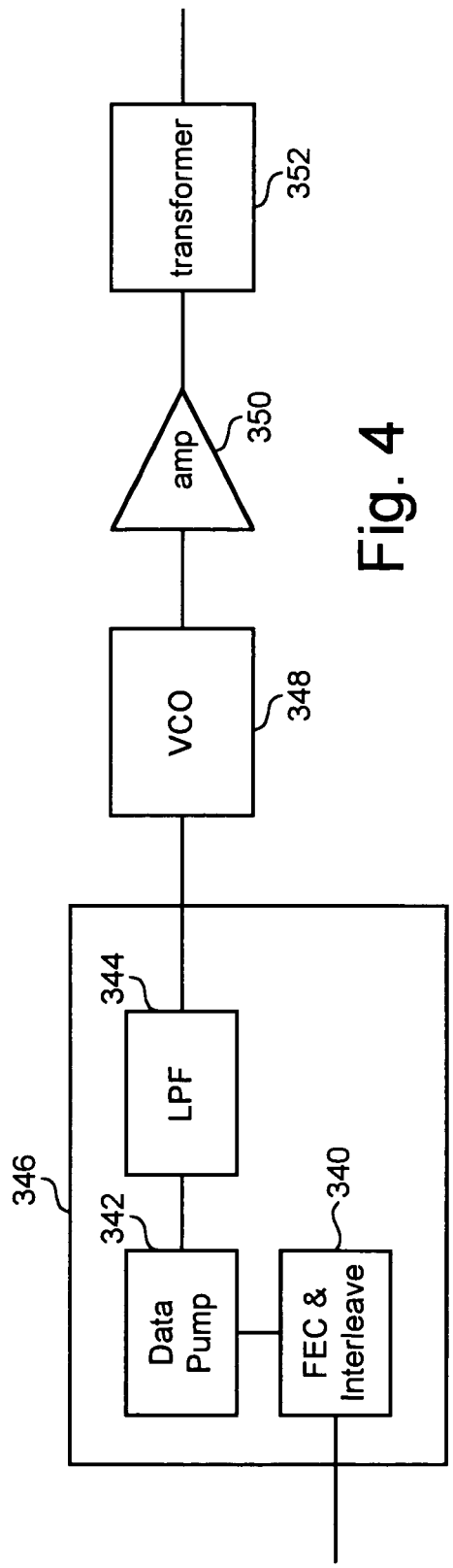
FIG. 4 is a block diagram of the audio modulation circuit used in one embodiment of the present invention.

FIG. 4 is a block diagram of modulator 244 of FIG. 2. The input of modulator 244 is first sent to FEC and Interleave unit 340, which receives the data, adds forward error correction and error detection information (cyclic redundancy check—CRC) and interleaves the result for burst-error protection. The output of FEC and Interleave unit 340 is sent to data pump 342, which converts the data into a four level analog signal. The output of data pump 342 is sent to low pass filter 344. The output of data pump 342 is said to be in the form of level coded symbols. The output of low pass filter 344 is sent to a voltage controlled oscillator 348 which is used to modulate an audio signal with a 10 KHz center frequency (also called FM for "frequency modulation"). The output of voltage controlled oscillator 348 is sent to amplifier 350. The output of amplifier 350 is sent to transformer 352. The output of transformer 352 is sent to the microphone input channel of a video camera via audio driver 246. FIG. 4 shows box 346 drawn around FEC and Interleave unit 340, data pump 342 and low pass filter 344. In one embodiment, the functions inside box 346 are performed by a Mx919 4-Level FSK Modem Data Pump from MX•COM, Inc., 4800 Bethania Station Road, Winston-Salem, N.C. 27105, (800) 638-5577, www.mxcom.com.

Figure 5:
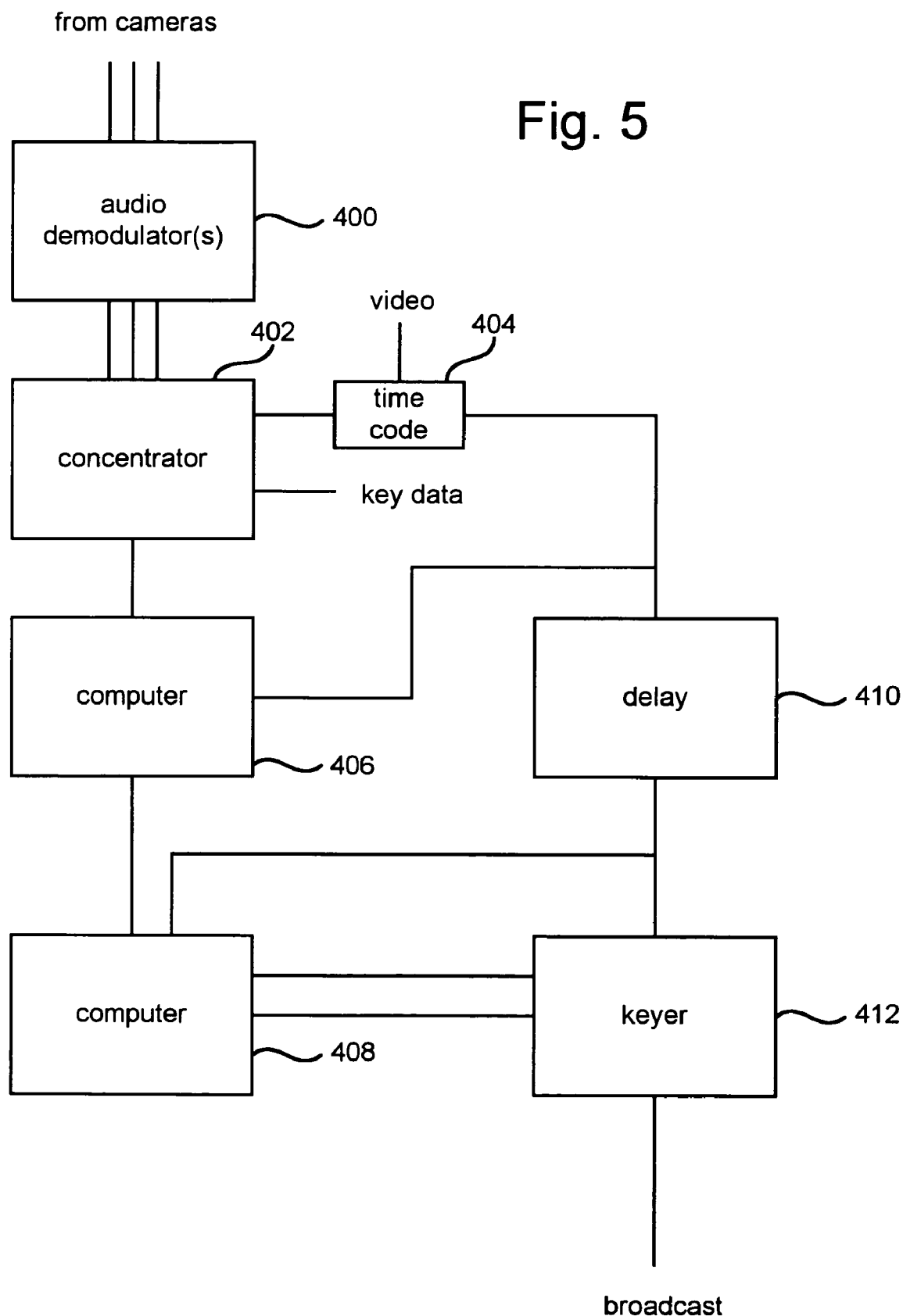
FIG. 5 is a block diagram of the graphics production hardware.

FIG. 5 is a block diagram of the graphics production equipment. In one embodiment, the equipment depicted in FIG. 5 is used in a truck at an event. Alternatively, the equipment can be in a studio or another suitable location.

Audio demodulator 400 receives audio signal(s) from one or more cameras. In one embodiment, it receives audio signals from three cameras. In alternative embodiments, audio demodulator 400 can receive audio signals from less than three cameras (even one camera) or more than three cameras. Each of the audio signals includes data from the sensors associated with the camera providing the audio signal. Audio demodulator 400 extracts the data from the audio signal and sends the data for each of the associated cameras to concentrator 402. Concentrator 402 receives the camera attitude data for sensors from one or more cameras and packages the data for transmission to computer 406. In one embodiment, concentrator 402 is a computer. Concentrator 402 also receives a time code from time code generator 404. The time code is packaged with the data from the various sensors so that the data can be synchronized with the appropriate frame or field of video. In one embodiment, time code 404 is a VITC (Vertical Interval time Code) inserter. Time code generator 404 receives the tallied video signal and provides a time code, based on the received video, to concentrator 402. After time code generator 404, the video signal is sent to computer 406 and delay 410. In one embodiment, a time code and a unique camera identifier are added to the vertical blanking interval of the video from the instrumented cameras. In another embodiment, a time code is added to the sensor data at the camera location, prior to transmission to audio demodulator 400. Concentrator 402 also receives key data from another processor. The key data is used to indicate which colors in the video can be enhanced or blended with the new graphic. This allows the system to account for occlusions. More information about using key data can be found in U.S. patent application Ser. No. 09/160,534, System For Enhancing a Video Presentation of a Live Event, Gloudemans, et al. and U.S. patent application Ser. No. 09/425,992, filed on Oct. 21, 1999, Telestrator System, Meier, et al. both of which are incorporated herein by reference.

The combined data from the sensors is sent to computer 406. Computer 406, computer 408, delay 410 and keyer 412 are used to enhance live video from a chosen camera. The present invention works with various systems for enhancing the video. For example, suitable systems are described in the following patents/applications: U.S. Pat. No. 5,912,700, A System for Enhancing the Television Presentation of an Object at a Sporting Event, U.S. Pat. No. 5,917,553, Method And Apparatus For Enhancing The Broadcast of a Live Event, U.S. patent application Ser. No. 09/041,238, System For Determining The Position Of An Object, filed Jan. 6, 1998, U.S. patent application Ser. No. 09/160,534, A System For Enhancing a Video Presentation of a Live Event, filed Sep. 24, 1998, all of which are incorporated herein by reference.

Computer 406 receives the sensor data, key data and time codes from concentrator 402. Computer 406 also receives the video signal, including VITC. In one embodiment, computer 406 is used to choose a location on the playing field of a sporting event. The location can be chosen using any suitable means including a pointing device, a keyboard, or a software process. The three dimensional coordinates associated with the chosen position are determined using any number of means in the art including using a model, prestoring locations, manually entering the locations, sensors (infra-red, radar, . . . ) etc. Using the data from the camera attitude sensors, computer 406 converts the three dimensional location(s) of the chosen location to two dimensional position(s) in the frame or field of video from the chosen camera. That two dimensional position(s) are sent to computer 408 to draw (or set up) a field or frame of video with the graphic. Computer 408 then sends instructions to a keyer to combine the graphic with the video from the camera. The video from the chosen camera is sent first to delay 410 in order to delay the video a number of frames to allow for the processing of the camera attitude information and the other methods of computers 406 and 408. After being delayed, the video is sent from delay 410 to keyer 412 for combining with the graphic(s) generated by computer 408. The output of keyer 412 can be sent for broadcast or recorded for future use. In the embodiment described above, the components operate in real time and enhance live video. In another embodiment, the camera attitude information can be used to enhance pre-stored video. An example of a graphic can be a line added to a video of a football game; a virtual advertisement; a cloud to show the location of a moving object; or any other suitable graphic.

In one embodiment, a third computer can be added to computers 406 and 408. The third computer can be used to provide a user interface which, among other things, allows an operator to choose which colors can be replaced with a graphic. This third computer would supply the key data to concentrator 402. In this embodiment, computer 406 determines where within a given field or frame a graphic should be inserted and computer 408 draws the graphic and synchronizes the graphic with the appropriate field or frame.

Figure 6:
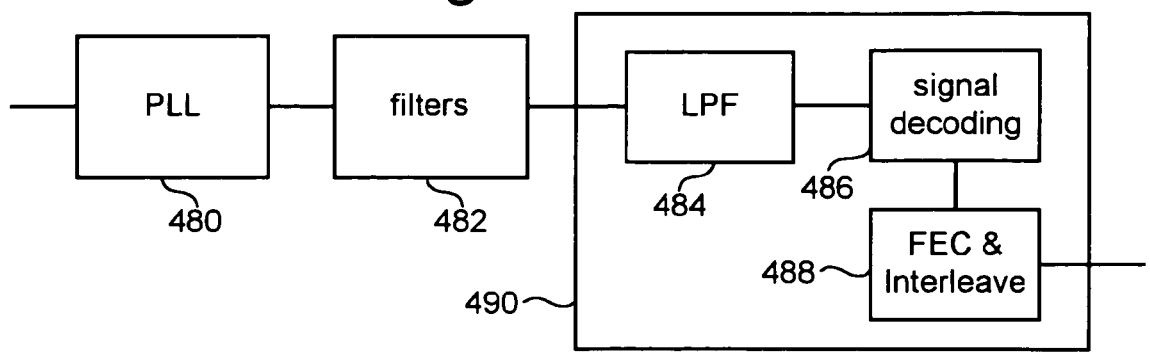
FIG. 6 is a block diagram of the audio demodulator circuit of FIG. 5.

FIG. 6 is a block diagram of audio demodulator 400. Data is first sent to phase-locked-loop circuit 480. The output of phase-lock-loop circuit 480 is sent to filters 482. The output of filters 482 is communicated to low pass filter 484. The output of low pass filter 484 is sent to signal decoder 486, which reverts the four level analog signal back to a digital signal. The output of signal decoder 486 is sent to FEC Interleave module 488 which completes the forward error correction and accounts for the interleaving. The output of FEC and Interleave module 488 is sent to concentrator 402. Box 490 is drawn around low pass filter 484, signal decoder 486 and FEC and Interleave module 488 to indicate that all three functions can be combined into one chip. For example, all three functions can be performed by using the MX919 chip from MX•COM, described above. The circuit of FIG. 6 is used to operate on data for one camera. If data from multiple cameras is considered, then audio demodulator 400 will include multiple circuits like that of FIG. 6.

Figure 7:
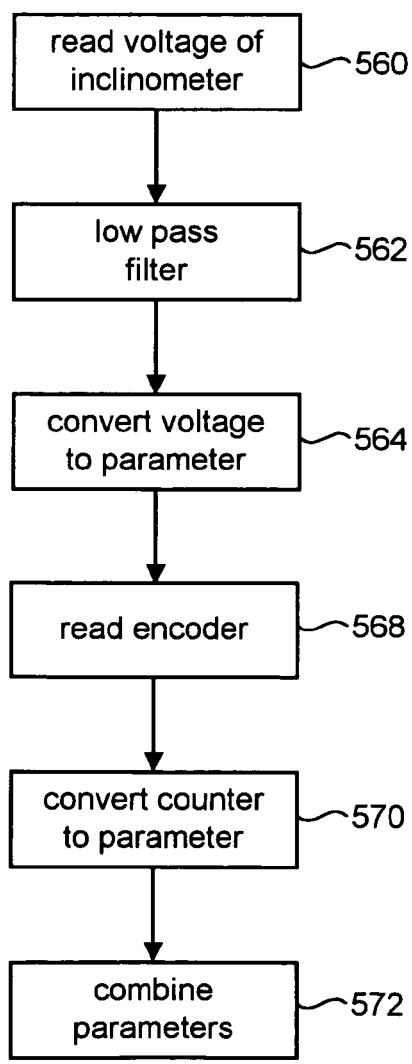
FIG. 7 is a flow chart of one embodiment of a method of determining camera attitude information using an inclinometer with an encoder.

FIG. 7 is a flow chart describing one method for using the inclinometers with an optical encoder. In step 560, voltages are read from each of the inclinometer sensors (e.g. 28 and 30). In one embodiment, step 560 includes a signal being processed by interface boards 230 and 232 to analog to digital converter 214, and through FPGA 212 to processor 216. Processor 216 will read the appropriate values at the appropriate time according to the sync signal sent from sync decoder 240. In step 562, the data is passed through a low pass filter. In one embodiment, the low pass filter can be performed using hardware. In other embodiments, computer 406 can implement a low pass filter using software. The low pass filter could include averaging data over a period of time. For example, samples from 30 frames of data can be averaged. In one alternative, the data can be averaged by looking at 15 samples ahead in time and 15 samples behind in time.

The reason why there are samples ahead in time is because the video is delayed by frame delay 410. Other time frames other than samples of 30 frames or 30 fields can also be used.

In step 564, the values read from the inclinometers are converted to a camera attitude parameter for use by the production equipment. For example, the voltages can be converted to angles. One means for converting voltage to an angle is to use a look up table. In another embodiment, a scaling factor can be applied to the voltage to convert the voltage to an angle. The angle can be expressed in degrees, radians or another unit of measure. Rather than converting the voltage to an angle, the voltage can be converted to a different form of an attitude parameter (e.g. such as a variable in a matrix).

In step 568, the system reads the encoder. Note that step 568 may be performed at the same time as step 560. Step 568 includes FPGA 212 receiving data from one of the encoders and providing that data to processor 216. Processor 216 will read the data in accordance with the sync signal from sync decoder 240. In step 570, the data from the encoder is converted to a camera attitude parameter for use by the production equipment. For example, the voltage can be converted to an angle. In step 572, the parameter from the encoder is combined with the parameter(s) from the inclinometer(s). Remember that the encoder measures the amount of rotation of the camera with respect to the base. In one embodiment, the inclinometers measure attitude of the base. Thus, the actual orientation is determined by using information from both encoders and both inclinometers. The inclinometers can be thought of as measuring roll and pitch of the tripod, while the pan encoder measures pan angle of the camera with respect to the base of the tripod or in relation to the tripod head interface. The pan axis is moved from a completely vertical axis to a different orientation based on roll and/or pitch. A similar analysis applies for tilt. One method for performing step 572 is to create one or more transformation matrices (to be used in step 712 of FIG. 11). Another embodiment uses different means known in the art for summing angles from different sensors.

Figure 8:
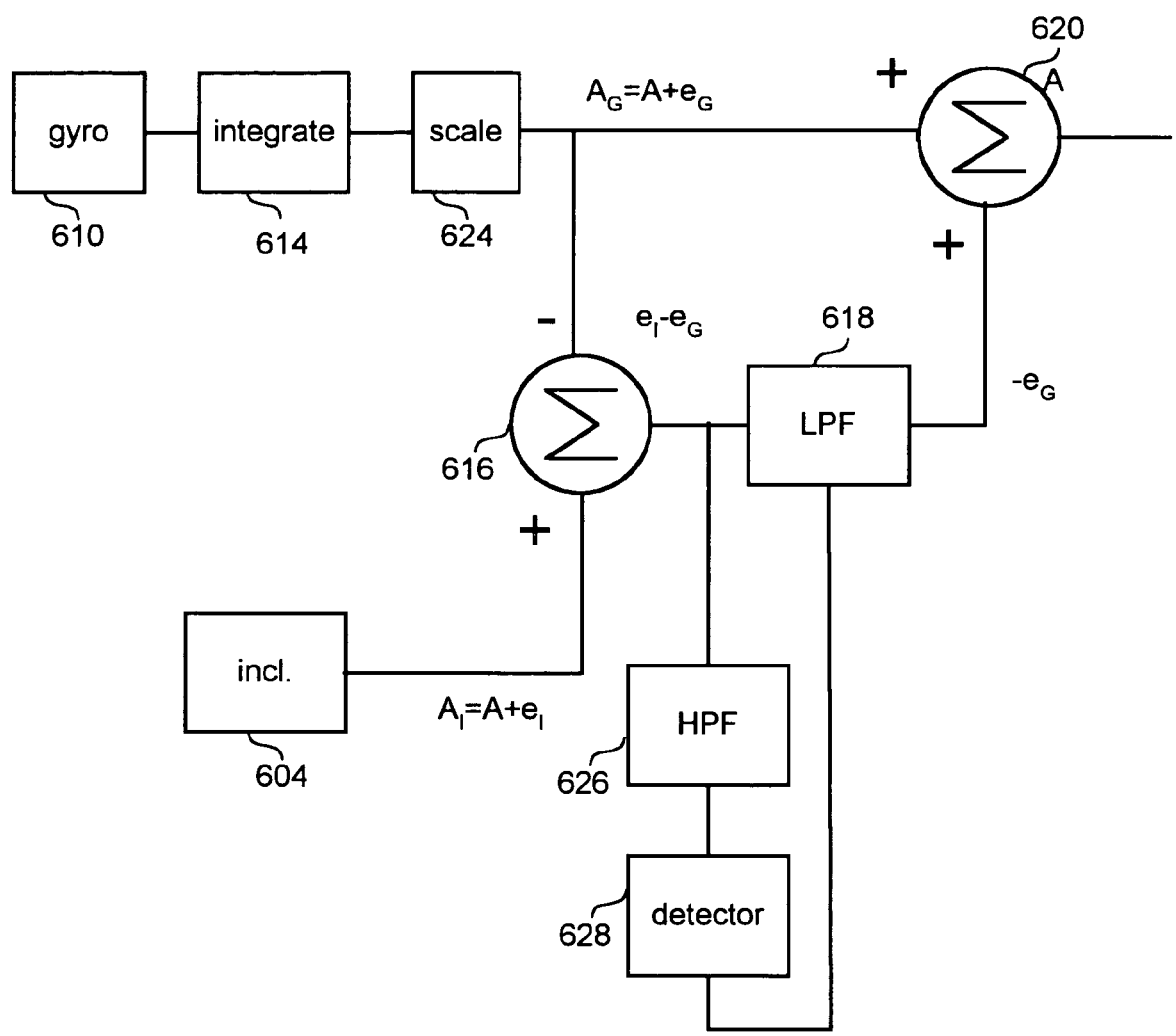
FIG. 8 depicts one embodiment of a method of determining camera attitude information using a gyro and an inclinometer.

FIG. 8 explains one method for combining a gyro with an inclinometer. The embodiment of FIG. 8 assumes that the gyros are mounted on the tripod head interface 10 such that for each inclinometer there is a gyro mounted to measure data for the same axis. One gyro and one inclinometer are mounted on the pitch axis. Another gyro and inclinometer are mounted perpendicular to the pitch axis devices in order to measure the roll axis. Each gyro and inclinometer pair are independently used to measure pitch and roll. An additional gyro or gyro/inclinometer pair can also be used to measure yaw. The system of FIG. 8 is used to measure pitch. An identical system is used to measure roll.

Gyro 610 is a fiber optic gyro which measures angular rate. It does not have any reference to absolute angle. It can accurately measure the relative angular change. The output of gyro 610 is integrated using a digital or analog integrator 614. The output of integrator 614 will represent an angle. The output of integrator 614 is scaled (block 624). We can describe the measured output of the integrated gyro signal as $A_G = A + e_G$ where $A_G$=integrated angle, A=actual angle gyro 610 was rotated and $e_G$=error induced by gyro 610. The error $e_G$ is largely due to the offset drift of the gyro and only has low frequency components.

Inclinometer 604 can accurately measure the true pitch or roll of the camera mount but is subject to acceleration errors. Gravity and acceleration of a reference frame are indistinguishable, so it is difficult to tell the difference between gravity indicating which way is "down" and acceleration imposed on the sensor. Imagine that the camera mount is not disturbed and is on a very stable platform. The inclinometer will accurately read the angle of the camera mount because the only force acting on the inclinometer is gravity. If the camera mount is tilted, it will accurately measure the new pitch or roll. During the transient when rotating the camera mount, acceleration will be induced on the sensor unless the axis of rotation is precisely through the inclinometer sensor and the pan axis is nearly frictionless. The axis of rotation will typically not be through the inclinometer, so changes in pitch or roll will induce a transient error in the inclinometer reading. In addition to this error, the device being used has a slow response to transients. If the device is rotated rapidly about the axis so as not to induce acceleration errors, the response time is about one second. If we think about the inclinometer signal output errors in the frequency domain, we can say that the low frequency errors are very small because the average acceleration will be near zero as long as we are not translating the inclinometer to a new position. Most of the inclinometer errors will be high frequency due to transient accelerations. Let $A_I=A+e_I$ where $A_I$=measured angle from inclinometer, A=actual angle inclinometer 604 was rotated and $e_I$=the inclinometer measurement error due to acceleration and sensor response. The error $e_I$ will have very little low frequency components.

Summer 616 will subtract $A_G$ (output of scale block 624) from $A_I$ (output of inclinometer 604) yielding $e_I$–$e_G$. This signal is passed through low pass filter (LPF) 618. The cutoff frequency of LPF 618 is chosen to pass the gyro error signal $e_g$ but reject inclinometer error signal $e_I$. A typical cutoff frequency is 0.2 Hz. The output of LPF 618 will be –$e_G$. Summer 620 will add signal $A_G$ from scale block 624 to –$e_G$ from LPF 618. The result is signal A, the desired actual angular rotation.

An enhancement to the method is to adaptively set the cutoff frequency of LPF 618. If the system is not experiencing any acceleration, it is advantageous to raise the cutoff frequency to reduce errors due to drift in the gyro. If the system is experiencing accelerations, it is advantageous to lower the cutoff frequency to reduce the errors due to the inclinometer. Acceleration errors will be seen as a high frequency signal at the output of summer 616. The output of summer 616 is sent to high pass filer (HPF) 626. The output of HPF 626 is then sent to a fast attack, slow decay detector 628. The output of detector 628 is used to set the cutoff frequency of LPF 618.

Figure 9:
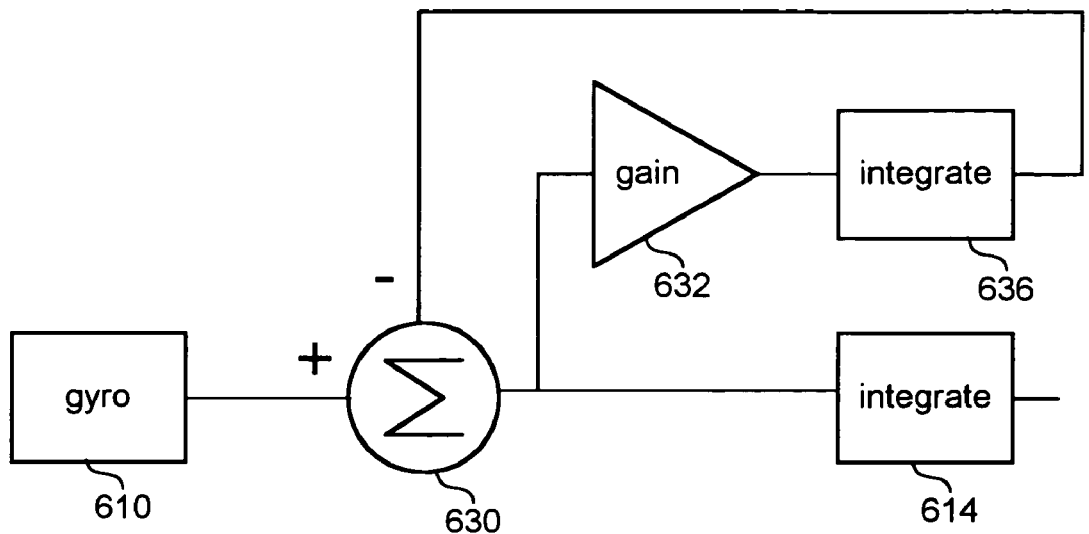
FIG. 9 depicts one embodiment of compensating for gyro offset.

FIG. 9 shows one embodiment for automatically compensating for gyro offset correction. If the gyro is not rotating, it will have some non-zero signal. If this non-zero signal is integrated, the resulting signal will be a ramp signal. In the embodiment where the gyro is mounted to a fixed portion of the camera assembly, over the long term the gyro is not rotating through a net angle. The average angle change is zero. FIG. 9 shows the output of gyro 610 being sent to subtractor 630. The output of subtractor 630 is sent to integrator 614 and amplifier 632. The output of amplifier 632 is sent to integrator 636 and the output of integrator 636 is subtracted from the output of gyro 610 by subtractor 630. Subtractor 630, amplifier 632 and integrator 636 comprise a feedback system that generates an offset signal that cancels the gyro offset. After a period of time determined by the gain of amplifier 632, the signal at the output of integrator 636 will be equal to the offset of gyro 610.

In another enhancement, a gyro may be placed on the stationary portion of the camera assembly (e.g. tripod, tripod head interface) so it is sensitive to the pan axis. If the camera is panned very quickly, the camera mount may twist. The pan encoder 618 will not measure the amount of twist. A gyro will measure this twist and a correction can be applied to the resulting pan axis.

Figure 10:
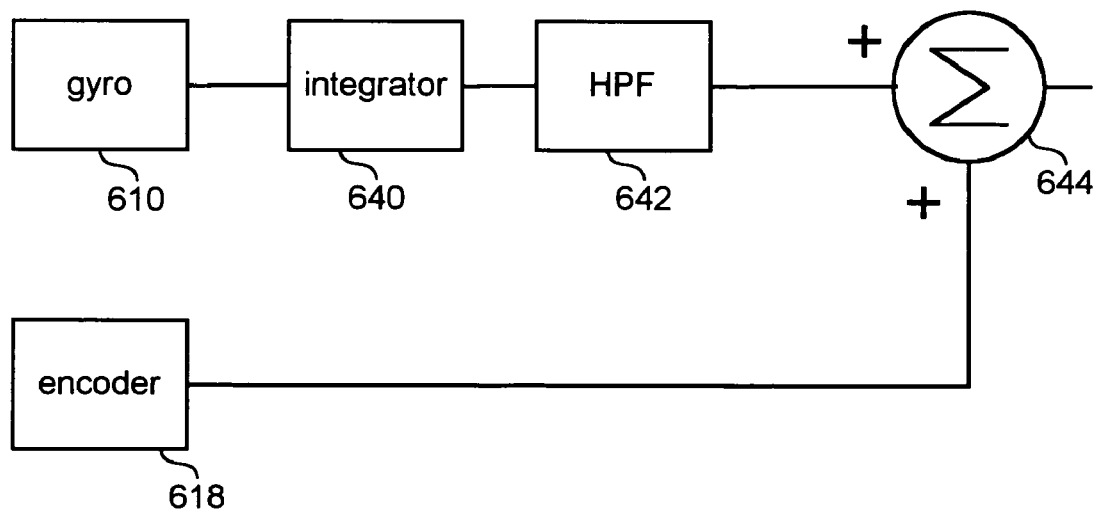
FIG. 10 depicts one embodiment of determining camera attitude information using a gyro and an encoder.

FIG. 10 shows how the gyro may be high pass filtered and combined with the pan axis encoder. The output of gyro 610 is sent to integrator 640. The output of integrator 640 is sent to high pass filter 642. The output of high pass filter 642 is added (summer 644) to the output of pan encoder 618.

Figure 11:
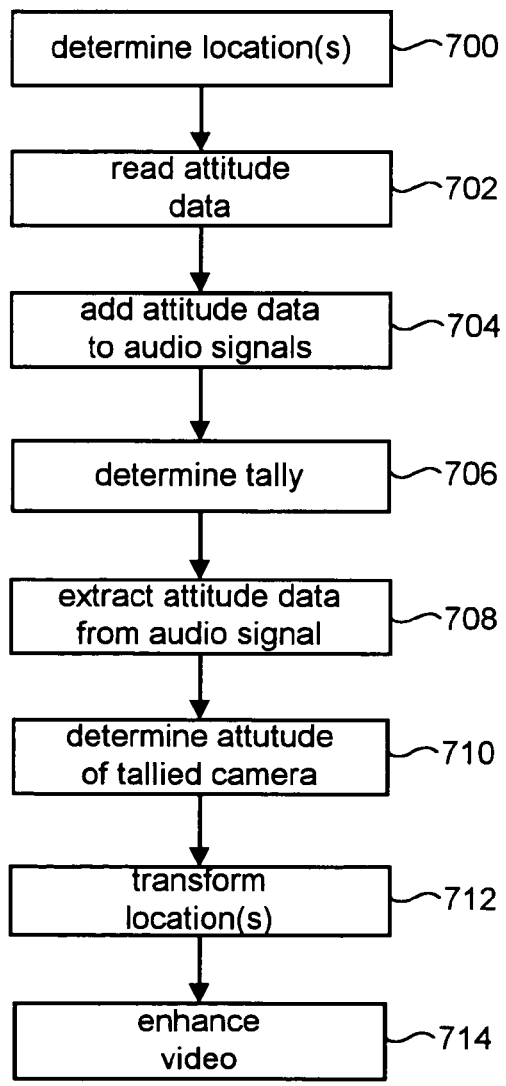
FIG. 11 is a flow chart describing one method of using camera attitude information to enhance video.

FIG. 11 is a flow chart which describes how the camera attitude information is used by the system for enhancing video. In step 700, the system or an operator determines the location to be enhanced. That could be a location on a playing field, in a stadium or another location. For example, if the system is to enhance a broadcast of a football game by depicting a first down line (e.g. the line a player must cross to achieve a first down) or to add an offside line to a soccer telecast, the system or person can indicate the location on the field where the line should be drawn using any conventional input device (e.g. keyboard, pointing device, etc.). That location can be associated with one or more three dimensional coordinates. In one embodiment, the location is the current location of a moving object. In step 702, attitude data is read from the various attitude sensors (e.g. inclinometer, gyro, encoder, etc.). In many broadcasts of sporting events, multiple cameras are used. Thus, attitude sensors may be used with one or more cameras. Step 702 includes reading the attitude data for all the cameras. In some embodiments, step 702 can include reading data for only a subset of the cameras. In step 704, the attitude data for the cameras is added to the respective audio signal for the corresponding camera. In step 706, the system determines the tally. The tally indicates which camera is being used for broadcast. That is, there may be twelve cameras at a sporting event; however, usually only one camera is chosen for broadcast at any one given time. The system can determine the tally by having an automatic tally detector, looking for a unique camera identifier in the vertical blanking interval or reading tally information from other production equipment. One could even enter the tally manually by watching or listening to the director, etc. By knowing which camera is tallied, the system can determine which set of camera attitude data to use. That is, only the camera attitude data associated with the camera tallied is used to enhance the video.

In step 708, the attitude information is extracted from the audio signals. In one embodiment, attitude information for all of the cameras are extracted from all the respective audio signals by audio demodulator(s) 400 and sent to concentrator 402 which then sends the combined signal to computer 406. In another embodiment, only the data from the tallied camera is extracted. In step 710, the system determines the attitude of the tallied camera. Determining the attitude can include the teachings of FIGS. 7–10. In one embodiment, the data from each of the sensors can be converted to appropriate parameters for insertion into transformation matrices. In step 712, the location(s) determined in step 700 are transformed to a two dimensional position in the frame or field of video from the tallied camera. Step 712 includes multiplying the determined location(s) by one or more transformation matrices, where the parameters of the transformation matrices are determined from the camera attitude data. In step 714, the video is enhanced by placing a graphic at the two dimensional location(s) determined in step 712.

The following discussion provides more detail in regard to steps 710 and 712 for an exemplar system using inclinometers, and/or gyros, with encoders. To convert a three-dimensional location to a two dimensional position, a four-by-four transformation matrix $[M_{w,c}]$ maps a four dimensional row vector representing the three dimensional location in world coordinates into a two dimensional position in camera coordinates.

There are four coordinate systems to consider: world coordinates, three dimensional camera coordinates, two dimensional camera (screen) coordinates and roll/pitch coordinates. The roll/pitch coordinates define the coordinate system with the inclinometers at or near the origin. The pan axis may or may not be vertical. The tilt axis may or may not be horizontal. Roll and pitch will describe the direction vector of the pan axis and the tilt axis.

The world coordinates are the coordinates of the playing field or event. In the system for enhancing a football game, the world coordinates can be a system with the origin in the corner of the football field. The positive x-axis in world coordinates is defined by the sideline closest to the cameras, the positive y-axis in world coordinates is defined by the goal line to the left of the direction of the cameras and the positive z-axis points upward, perpendicular to the x-axis and y-axis. If the positive y-axis in world coordinates is rotated counter-clockwise $\Phi$ degrees around the positive z-axis so that the new positive y-axis is pointing in the same direction as the camera when the tilt of the camera is level (perpendicular to the direction of gravity) and the camera's pan encoder measures zero, then the pan offset for that particular camera is $\Phi$. For the analysis below, assume that the roll is represented by the variable $\rho$ and the pitch is represented by the variable $\psi$. The values $\rho$&$\psi$ are the output A of summer 620 of FIG. 8. Roll and pitch are measured by the inclinometers alone, gyros alone, or a combination of inclinometers and gyros. Assume that because the roll and pitch changes the orientation of the pan axis (and perhaps the tilt axis), the new unit direction vector of the pan axis is given by the vector $(v_1, v_2, v_3)$. Then, the following equations define variables used in the matrices.

$(v_1,v_2,v_3)\cdot(1,0,0)=v_1=\cos(90°-\rho)=\sin(\rho)$ $(v_1,v_2,v_3)\cdot(0,1,0)=v_2=-\cos(90°-\psi)=-\sin(\psi)$ $v_1^2+v_2^2+v_3^2=1$ $v_3 = (1 - v_1^2 - v_2^2)^{\frac{1}{2}}$ $(0,0,1)\cdot(v_1,v_2,v_3)=v_3$ $T=\arccos(v_3)$ Additionally, assume that the origin of the roll/pitch axis (location of a fixed point near inclinometers and/or gyros) in world coordinates is (rpx, rpy, rpz). Using these variables, the matrix $[M_{w,c}]$ is created by multiplying a first matrix $[M_{w,rp}]$ by a second matrix $[M_{rp,c}]$. The matrix $[M_{w,rp}]$ represents a transformation from world coordinates to roll/pitch coordinates. The matrix $[M_{rp,c}]$ represents a transformation 110 from roll/pitch coordinates to two dimensional camera coordinates. The matrices are defined as follows:

$[M_{w,c}]=[M_{w,rp}]\times[M_{rp,c}]$.

The matrix $[M_{w,rp}]$ is defined by $[M_{w,rp}]=[T_{-rp}][R_{z,-\Phi}][R^T]$ where $$[T_{-rp}] = \begin{bmatrix} 1 & 0 & 0 & 0 \\ 0 & 1 & 0 & 0 \\ 0 & 0 & 1 & 0 \\ -rpx & -rpy & -rpz & 1 \end{bmatrix}$$

$$[R_{z,-\Phi}] = \begin{bmatrix} \cos(\Phi) & -\sin(\Phi) & 0 & 0 \\ \sin(\Phi) & \cos(\Phi) & 0 & 0 \\ 0 & 0 & 1 & 0 \\ 0 & 0 & 0 & 1 \end{bmatrix}$$

$$[R^T] = \begin{bmatrix} \dfrac{-v_1^2+\cos(T)+1}{(1+\cos(T))} & \dfrac{-v_1 v_2}{(1+\cos(T))} & v_1 & 0 \\ \dfrac{-v_1 v_2}{(1+\cos(T))} & \dfrac{-v_2^2+\cos(T)+1}{(1+\cos(T))} & v_2 & 0 \\ -v_1 & -v_2 & \cos(T) & 0 \\ 0 & 0 & 0 & 1 \end{bmatrix}.$$

The matrix $[M_{rp,c}]$ is defined by $[M_{rp,c}]=[R_{z,\Phi}][T_{rp}][K]$ where $$[T_{rp}] = \begin{bmatrix} 1 & 0 & 0 & 0 \\ 0 & 1 & 0 & 0 \\ 0 & 0 & 1 & 0 \\ rpx & rpy & rpz & 1 \end{bmatrix}$$

$$[R_{z,\Phi}] = \begin{bmatrix} \cos(\Phi) & \sin(\Phi) & 0 & 0 \\ -\sin(\Phi) & \cos(\Phi) & 0 & 0 \\ 0 & 0 & 1 & 0 \\ 0 & 0 & 0 & 1 \end{bmatrix}.$$

The matrix $[R_{z,\Phi}]$ is the four-by-four matrix corresponding to a counter-clockwise rotation by $\Phi$ degrees around the positive z-axis. The matrix $[T_{rp}]$ denotes a four by four matrix corresponding to a translation by (rpx, rpy, rpz). The matrix $[R^t]$ is the inverse of the matrix which provides a transformation from roll/pitch coordinates to world coordinates. The matrix $[K]$ represents a transformation matrix for transforming a three dimensional location in world coordinates to a two dimensional position in camera coordinates for a system that uses encoders but does not use inclinometers or gyros, and is similar to the transformation matrices described in U.S. patent application Ser. No. 09/160,534 and U.S. Pat. No. 5,912,700, both of which are incorporated by reference. The matrix $[K]$ is defined as:

$[K]=[T][A][D][B][C][G]$ where the matrix $[G]$ is defined as $$[G] = \begin{bmatrix} fh & 0 & 0 & 0 \\ 0 & fv & 0 & 0 \\ 0 & 0 & -(f+n)/(f-n) & -1 \\ 0 & 0 & -2fn/(f-n) & 0 \end{bmatrix}.$$

The matrix $[G]$ models the effective focal length of the lens as a function of zoom, focus, and 2X Extender settings.

The variables n and f are the distances to the mathematical near and far clipping planes, which are only important in assigning a useful range for z-buffered graphics drawings; therefore, nominal values are used of n=1 yard and f=100 yards. The variable fh is the effective horizontal focal length of the lens. The variable fv is the effective vertical focal length of the lens. The aspect ratio, which is constant, is fv/fh. A software routine is used to convert the appropriate zoom factor and aspect ratio to fh and fv.

The matrix [A] is defined as:

$$[A] = \begin{bmatrix} \cos(pan) & -\sin(pan) & 0 & 0 \\ -\sin(pan) & \cos(pan) & 0 & 0 \\ 0 & 0 & 1 & 0 \\ 0 & 0 & 0 & 1 \end{bmatrix}.$$

The matrix [B] is defined as:

$$[B] = \begin{bmatrix} \cos(twist) & 0 & \sin(twist) & 0 \\ 0 & 1 & 0 & 0 \\ -\sin(twist) & 0 & \cos(twist) & 0 \\ 0 & 0 & 0 & 1 \end{bmatrix}.$$

The matrix [C] is defined as:

$$[C] = \begin{bmatrix} 1 & 0 & 0 & 0 \\ 0 & 0 & -1 & 0 \\ 0 & 1 & 0 & 0 \\ 0 & 0 & 0 & 1 \end{bmatrix}.$$

The matrix [D] is defined as:

$$[D] = \begin{bmatrix} 1 & 0 & 0 & 0 \\ 0 & \cos(tilt) & -\sin(tilt) & 0 \\ 0 & \sin(tilt) & \cos(tilt) & 0 \\ 0 & 0 & 0 & 1 \end{bmatrix}.$$

The matrix [T] is defined as $$[T] = \begin{bmatrix} 1 & 0 & 0 & 0 \\ 0 & 1 & 0 & 0 \\ 0 & 0 & 1 & 0 \\ -lx & -ly & -lz & 1 \end{bmatrix}.$$

The parameters in the above described matrices are discussed below.

The pan parameter is defined as (pan=pan/reg−ptzfdit.pan), where ptzfdit.pan is measured with the pan optical encoder during the event. The variable pan/reg is determined using the pan optical encoder prior to the event. First, the camera's optical center is pointed to a known fiducial. A known fiducial is a marking or location whose coordinates are known by accurately measuring the coordinates in relation to the origin. The coordinates of a fiducial can be measured using a laser plane, tape measure, and/or other suitable methods. The pan encoder reading in degrees (θ) is noted. The x,y coordinates of the fiducial (x1,y1) are noted. The x, y coordinates of the camera are noted (x2,y2). An angle α is determined as:

$$\alpha = \tan^{-1}((y1-y2)/(x1-x2)).$$

The pan registration variable is computed as:

$$pan/reg = 180° - \theta - \alpha$$

The tilt parameter is defined as (tilt=ptzfdit.tilt−level_tilt,), where ptzfdit.tilt is measured with the tilt optical encoder during the event. The variable level_tilt represents the output of the tilt optical encoder at level tilt. Level tilt is the tilt of the camera when the optical axis is perpendicular to the force of gravity. Level tilt is found by setting a laser plane next to the camera at the level of the camera's lens. A stick or other object that can be used to view the marking from the laser plane should be placed across the stadium at a height to receive the beam. By pointing the optical center of the camera on the point illuminated on the stick by the laser plane across the stadium, the camera is brought to level tilt. The level_tilt parameter is the encoder reading, in degrees (or radians) at level tilt.

The twist parameter is determined by pointing the camera at the field (or other portion of an environment) and the output of the camera is sent to a computer. The image of the camera is superimposed over a transformed image of a model of the environment. A slider on a graphical user interface (GUI) is used to alter the twist of the camera image so that it completely aligns with the image of the model. The degree of alignment correction is recorded as the twist parameter. Note that the transformation of the image of the model is performed with the best parameters known at the time.

The nodal_dist variable (used below) is the distance from the pan axis to the nodal point of the camera model. The distance is positive in the direction of the camera along the optical axis through the front piece of glass on the lens of the camera. The nodal point is the position of the camera's virtual point of view measured as a distance forward of the pan axis when the camera is in the horizontal position. The variable, nodal_dist, changes for different zoom percentages and extender settings of the camera. The manufacturer of the lens can provide values that determine nodal_dist at different zoom percentages and extender settings. In one example, the manufacturer of the lens can provide a table of the distance of the nodal point from the front piece of glass on the lens for each extender setting and a range of zoom percentages. For example, if the distance of the nodal point from the front piece of glass on the lens is dp yards, and the length of the lens is lens_len yards, then nodal_dist=lens_len−dp, where nodal_dist is measured in yards. If data from the manufacturer of the lens is not available, the information can be measured on an optical bench and a lookup table built as a function of zoom position, focus, and 2X Extender setting. The information of the lookup table is measured by placing two targets in the view of the camera, off-center, one farther away than the other, so they appear in line through the viewfinder. Where a line extended through those targets intersects the optical axis of the camera is the position of the nodal point or virtual point of view.

The coordinates (cx,cy,cz) are the world coordinates of the location of the camera, which is defined as the intersection of the pan axis and the optical axis when the tilt is level and the pan measures zero on the pan encoder. The coordinates (lx,ly,lz) are the world coordinates of the nodal point of the camera model for a given tilt, pan, zoom, and extender setting of the camera. The coordinates (lx,ly,lz) are defined by: (lx,ly,lz)=(cx,cy,cz)+(nx,ny,nz), where (nx,ny,nz, 1)=(0, nodal_dist,0,1)[Rx,tilt][Ry,pan]. The matrix [Rx,tilt] is defined as:

$$[Rx, \text{tilt}] = \begin{bmatrix} 1 & 0 & 0 & 0 \\ 0 & \cos(\text{tilt}) & \sin(\text{tilt}) & 0 \\ 0 & -\sin(\text{tilt}) & \cos(\text{tilt}) & 0 \\ 0 & 0 & 0 & 1 \end{bmatrix},$$

and the matrix [Ry,pan] is defined as $$[Ry, \text{pan}] = \begin{bmatrix} \cos(\text{pan}) & 0 & -\sin(\text{pan}) & 0 \\ 0 & 1 & 0 & 0 \\ \sin(\text{pan}) & 0 & \cos(\text{pan}) & 0 \\ 0 & 0 & 0 & 1 \end{bmatrix}.$$

After using the transformation matrices, the system takes into account lens distortion. That is, each two-dimensional pixel position is evaluated in order to determine if the two-dimensional position should change due to lens distortion. For a given two-dimensional pixel position, the magnitude of a radius from the optical center to the two-dimensional pixel position is determined. Lens distortion is accounted for by moving the pixel's position along that radius by an amount $\Delta R$:

$$\Delta R = K(R)^2$$

where
R=pixel distance from optical center to two-dimensional position
K=distortion factor.

At a fixed focus, the distortion factor is measured at a number of zoom values using a GUI slider to align the model to the video. These values are used to generate a distortion curve. During operation, the distortion factor at the current zoom is interpolated from the curve and applied to all transformed two-dimensional pixel positions points. The distortion data can also be obtained from the lens manufacturer or can measured by someone skilled in the art.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. The invention is, thus, intended to be used with many different types of live events including various sporting events and non-sporting events. It is intended that the scope of the invention be defined by the claims appended hereto.

We claim:

1. A system for using attitude sensors with a camera, said camera being part of a camera assembly, said camera assembly including a fixed portion and a movable portion, said system comprising:

a first sensor coupled to said camera assembly, said first sensor measures movement of said movable portion relative to said fixed portion; and a first inclinometer coupled to said camera assembly, said first inclinometer measures an angle of a first axis of said fixed portion of said camera assembly, said measured angle including an actual angle component attributable to a gravitational force on said first inclinometer and an error component attributable to an acceleration force on said first inclinometer;

a first gyro coupled to said camera assembly, said first gyro measures a relative angular change of said first axis, said measured relative angular change including an actual relative angular change component substantially equal to said actual angle component of said angle measured by said first inclinometer and an error component attributable to at least one of offset and drift of said first gyro;

circuitry adapted to receive said measured angle and said measured relative angular change, said circuitry combines said measured angle and said measured relative angular change to remove said error component of said measured angle and said error component of said measured relative angular change in order to determine a value of said actual relative angular change component.

2. A system according to claim 1, wherein:
said first sensor measures rotation of said movable portion about said first axis.

3. A system according to claim 2, wherein:
said first inclinometer measures a component of the movement of said first axis.

4. A system according to claim 1, wherein:
said first sensor is an optical encoder.

5. A system according to claim 1, further comprising:
a second inclinometer coupled to said camera assembly, said first inclinometer and said second inclinometer are used to measure an orientation of said camera assembly.

6. A system according to claim 5, wherein:
said first sensor is coupled to said movable portion;
said first inclinometer is coupled to said fixed portion; and
said second inclinometer is coupled to said fixed portion.

7. A system according to claim 5, wherein:
said first sensor measures panning of said camera;
said first inclinometer measures roll of said fixed portion; and
said second inclinometer measures pitch of said fixed portion.

8. A system according to claim 5, wherein:
said first sensor measures tilting of said camera;
said first inclinometer measures roll of said fixed portion; and
said second inclinometer measures pitch of said fixed portion.

9. A system according to claim 5, wherein:
data from said first sensor is combined with data from said first inclinometer and said second inclinometer in order to describe said camera's orientation.

10. A system according to claim 5, wherein:
data from said first sensor is combined with data from said first inclinometer and said second inclinometer, said combined data is used to transform a location in a first coordinate system to a position in a second coordinate system.

11. A system according to claim 5, further comprising:
a second sensor coupled to said camera assembly, said first sensor measures movement of said movable portion about said first axis and said second sensor measures movement of said movable portion about a second axis, said second inclinometer measures movement of said second axis.

12. A system according to claim 1, further comprising:
one or more processors, said one or more processors receive data from said first inclinometer, said first gyro, and said first sensor, said one or more processors programmed to determine attitude parameters describing an orientation of said camera based on said data from said first inclinometer, said first gyro, and said first sensor.

13. A system according to claim 12, wherein:
said one or more processors use said attitude parameters to transform a location in a first coordinate system to a position in a second coordinate system.

14. A system according to claim 1, wherein:
said fixed portion includes a tripod and a tripod head interface;
said movable portion includes at least a portion of a tripod head and said camera;
said first sensor is coupled to said tripod head;
said first gyro is coupled to said tripod head interface; and
said first inclinometer is coupled to said tripod head interface.

15. A system according to claim 1, further comprising:
sensor electronics located with said camera assembly and in communication with said first sensor and said first inclinometer, said sensor electronics reads data from said first sensor, said first gyro, and said first inclinometer and packages said data for transmission to a processor.

16. A system according to claim 15, wherein:
said sensor electronics encodes said packaged data for transmission in an audio signal to a first location, said processor being located at said first location.

17. A system according to claim 1, further comprising:
a second inclinometer coupled to said camera assembly, said second inclinometer measures an angle of a second axis of said fixed portion of said camera assembly, said first inclinometer is mounted in a first plane, said second inclinometer is mounted in a second plane, said first plane being orthogonal to said second plane;
a second sensor coupled to said movable portion, said first sensor and said second sensor are optical encoders, said first sensor measures rotation of said movable portion about said first axis, said second sensor measures rotation of said movable portion about said second axis, said first and second inclinometers measure movement of said first axis and said second axis;
a processor programmed to combine data from said first inclinometer, said second inclinometer, said first gryo, said first sensor and said second sensor in order to describe an orientation of said camera, said processor is in communication with said first inclinometer, said second inclinometer, said first gryo, said first sensor and said second sensor.

18. A system according to claim 17, further comprising:
a second gyro in communication with said processor, said processor combines data from said first gyro and said second gyro with data from said first inclinometer, said second inclinometer, said first sensor and said second sensor.

19. A system according to claim 1, wherein:
said first inclinometer is coupled with said fixed portion of said camera assembly.

20. A method for using attitude sensors with a camera, said camera being part of a camera assembly, said camera assembly including a fixed portion and a movable portion, said method comprising:
sensing data from a first sensor, said first sensor measures movement of said movable portion relative to said fixed portion;
sensing data from a first inclinometer, said first inclinometer measures an angle of a first axis of said camera assembly, said measured angle including an actual angle component attributable to a gravitational force on said first inclinometer and an error component attributable to an acceleration force on said first inclinometer;
sensing data from a first gyro, said first gyro measures a relative angular change of said first axis, said measured relative angular change including an actual relative angular change component substantially equal to said actual angle component of said angle measured by said first inclinometer and an error component attributable to at least one of offset and drift of said first gyro; and
combining said data from said first sensor, said data from said first inclinometer, and said data from said first gyro, said combining includes combining said measured angle and said measured relative angular change to remove said error component of said measured angle and said error component of said measured relative angular change in order to determine a value of said actual relative angular change component.

21. A method according to claim 20, wherein said step of combining includes:
creating one or more transformation matrices using said data from said first sensor, said data from said first gyro, and said data from said first inclinometer.

22. A method according to claim 20, further comprising the step of:
selecting a location in a scene;
converting said location to a position in a video image from said camera, said step of converting is based on said step of combining; and
adding a graphic to said video image from said camera at said position.

23. A method according to claim 20, wherein:
said first sensor measures rotation of said movable portion about said first axis;
said first gyro measures a component of the orientation of said first axis; and
said first inclinometer measures a component of the orientation of said first axis.

24. A method according to claim 20, further comprising the step of:
adding said data from said first sensor, said data from said first gyro, and said data from said first inclinometer to an audio signal for transmission to a first location, a first processor is located at said first location, said first processor performs said step of combining.

25. A method according to claim 20, further comprising
sensing data from a second gyro;
sensing data from a second sensor; and
sensing data from a second inclinometer;
wherein said step of combining includes combining said data from said first sensor, said data from said first gyro, said data from said first inclinometer, said data from said second sensor, said data from said second gryo, and said data from said second inclinometer.

26. A system according to claim 1, wherein:
said circuitry determines a value of said actual relative angular change component by determining a value of said actual angle component, said actual angle component being substantially equal to said actual relative angular change component.

27. A system according to claim 1, wherein:
said gyro is a fiber optic gyro.

28. A system according to claim 1, wherein said circuitry comprises:
a first summer, said first summer subtracts said measured relative angular change of said first axis from said measured angle of said first axis, said subtracting resulting in a value equal to a difference between said error component attributable to an acceleration force on said first inclinometer and said error component attributable to at least one of offset and drift of said first gyro;
a filter, said filter filters said value resulting from said subtraction to remove said error component attribute to an acceleration force on said first inclinometer, said filtering resulting in a value equal to an inverse of said error component attributable to at least one of offset and drift of said first gyro; and
a second summer, said second summer adds said measured relative angular change of said first axis to said value resulting from said filtering, said adding resulting in said value of said actual relative angular change component.

29. A method according to claim 20, wherein said step of combining comprises:
subtracting said measured relative angular change of said first axis from said measured angle of said first axis, said subtracting resulting in a value equal to a difference between said error component attributable to an acceleration force on said first inclinometer and said error component attributable to at least one of offset and drift of said first gyro;
filtering said value resulting from said subtraction to remove said error component attribute to an acceleration force on said first inclinometer, said filtering resulting in a value equal to an inverse of said error component attributable to at least one of offset and drift of said first gyro; and
adding said measured relative angular change of said first axis to said value resulting from said filtering, said adding resulting in said value of said actual relative angular change component.

30. A method according to claim 20, wherein:
said first inclinometer measures attitude information of at least a portion of said fixed portion of said camera assembly.

31. A system for using attitude sensors with a camera, said camera being part of a camera assembly, said camera assembly including a fixed portion and a moveable portion, said system comprising:
a first sensor coupled to said camera assembly, said first sensor measures movement of said movable portion with respect to said fixed portion along a first axis;
a first gyro coupled to said camera assembly, said first gyro measures a relative angular change of said first axis, said measured relative angular change of said first axis including an actual relative angular change component and an error component attributable to at least one of offset and drift of said first gyro;
a first inclinometer coupled to said camera assembly, said first inclinometer measures an angle of said first axis, said measured angle of said first axis including an actual angle component attributable to a gravitational force on said first inclinometer and an error component attributable to an acceleration force on said first inclinometer;
a second sensor coupled to said camera assembly, said second sensor measures movement of said movable portion with respect to said fixed portion along a second axis;
a second inclinometer coupled to said camera assembly, said second inclinometer measures an angle of said second axis, said measured angle of said second axis including an actual angle component attributable to a gravitational force on said second inclinometer and an error component attributable to an acceleration force on said second inclinometer;
a second gyro coupled to said camera assembly, said second gyro measures a relative angular change of said second axis, said measured relative angular change of said second axis including an actual relative angular change component and an error component attributable to at least one of offset and drift of said second gyro; and
circuitry adapted to receive said measured angle of said first axis, said measured relative angular change of said first axis, said measured angle of said second axis, and said measured relative angular change of said second axis, said circuitry combines said measured angle of said first axis and said measured relative angular change of said first axis to remove said error component of said measured angle of said first axis and said error component of said measured relative angular change of said first axis in order to determine a value of said actual relative angular change component for said first axis, said circuitry combines said measured angle of said second axis and said measured relative angular change of said second axis to remove said error component of said measured angle of said second axis and said error component of said measured relative angular change of said second axis in order to determine a value of said actual relative angular change component for said second axis.

32. A system according to claim 31, further comprising:
one or more processors receiving and combining data from said first gyro, said second gyro, said first inclinometer, said second inclinometer, said first sensor and said second sensor;
said one or more processors use said combined data to add a graphic to a video image from said camera at a first position in said video image, said graphic corresponds to a three dimensional location within a field of view of said camera, said three dimensional location corresponds to said first position in said video image.

33. A system according to claim 32, further comprising:
an audio signal generator in communication with and receiving sensor data from said first gyro, said secondgyro, said first inclinometer, said second inclinometer, said first sensor and said second sensor, said audio signal generator creates a compatible audio signal which includes said sensor data, said audio signal generator communicates said compatible audio signal to said camera for transmission in said camera audio signal; and
a data extractor receiving said camera audio signal and extracting said sensor data, said data extractor in communication with said one or more processors.

* * * * *

UNITED STATES PATENT AND TRADEMARK OFFICE
CERTIFICATE OF CORRECTION

PATENT NO. : 6,965,397 B1 Page 1 of 1
APPLICATION NO. : 09/472635
DATED : November 15, 2005
INVENTOR(S) : Honey It is certified that error appears in the above-identified patent and that said Letters Patent is hereby corrected as shown below:

Col. 23, lines 3-5: after "first gyro," delete "said secondgyro," and substitute therefore --said second gyro,--

Signed and Sealed this

Third Day of March, 2009

JOHN DOLL
*Acting Director of the United States Patent and Trademark Office*